US008294701B2

(12) United States Patent
Matsui et al.

(10) Patent No.: US 8,294,701 B2

(45) Date of Patent: Oct. 23, 2012

(54) DISPLAY PANEL DEVICE, DISPLAY DEVICE, AND CONTROL METHOD THEREOF

(75) Inventors: Masafumi Matsui, Kyoto (JP); Shinya Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/035,132

(22) Filed: Feb. 25, 2011

(65) Prior Publication Data

US 2011/0141095 A1 Jun. 16, 2011

Related U.S. Application Data

(63) Continuation of application No. PCT/JP2009/006213, filed on Nov. 19, 2009.

(51) Int. Cl.
*G06F 3/038* (2006.01)

(52) U.S. Cl. ......... 345/212; 345/204; 345/211; 345/690

(58) Field of Classification Search .............. 345/76–83, 345/87–96, 204–215, 690
See application file for complete search history.

(56) References Cited

U.S. PATENT DOCUMENTS

| | | | | |
|---|---|---|---|---|
| 2008/0198111 | A1 | 8/2008 | Yamashita et al. | |
| 2008/0231559 | A1 | 9/2008 | Uchino et al. | |
| 2009/0219235 | A1 | 9/2009 | Yamamoto et al. | |
| 2010/0214273 | A1 | 8/2010 | Shirouzu et al. | |
| 2010/0245331 | A1 | 9/2010 | Shirouzu et al. | |
| 2011/0057966 | A1 | 3/2011 | Ono | |
| 2011/0141095 | A1* | 6/2011 | Matsui et al. | 345/211 |
| 2011/0148949 | A1* | 6/2011 | Matsui et al. | 345/690 |

FOREIGN PATENT DOCUMENTS

| | | |
|---|---|---|
| JP | 2008-203655 | 9/2008 |
| JP | 2008-203657 | 9/2008 |
| JP | 2008-233652 | 10/2008 |
| JP | 2008-241783 | 10/2008 |
| JP | 2009-204979 | 9/2009 |

OTHER PUBLICATIONS

An English language translation and abstract of JP 2008-203655.

U.S. Appl. No. 13/035,175 to Masafumi Matsui et al., which was filed on Feb. 25, 2011.

U.S. Appl. No. 13/035,170 to Masafumi Matsui et al., which was filed on Feb. 25, 2011.

U.S. Appl. No. 13/082,660 to Shinya Ono, which was filed on Apr. 8, 2011.

* cited by examiner

*Primary Examiner* — Vijay Shankar

(74) *Attorney, Agent, or Firm* — Greenblum & Bernstein, P.L.C.

(57) ABSTRACT

A display panel device includes: a luminescence element; a capacitor including first and second capacitor electrodes; a driver having a gate connected to the first capacitor electrode for allowing a drain current to flow through the luminescence element; a first switch switchably interconnecting a data line and the first capacitor electrode for supplying a signal voltage to the capacitor; a second switch switchably interconnecting a source of the driver and the second capacitor electrode; and a controller. The controller is configured to: turn ON the first switch while the second switch is ON to supply the signal voltage to the first capacitor electrode and flow a current between the source of the driver and the second capacitor electrode; and, after predetermined time period, turn OFF the second switch to cause non-conduction between the source of the driver and the second capacitor electrode.

11 Claims, 17 Drawing Sheets

DISPLAY PANEL DEVICE, DISPLAY DEVICE, AND CONTROL METHOD THEREOF

CROSS REFERENCE TO RELATED APPLICATION

This is a continuation application of PCT application No. PCT/JP2009/006213 filed Nov. 19, 2009, designating the United States of America, the disclosure of which, including the specification, drawings and claims, is incorporated herein by reference in its entirety.

BACKGROUND OF THE INVENTION

1. Field of the Invention

The present invention relates to display panel devices, display devices, and control methods thereof, and in particular, to a display panel device and a display device using current-driven luminescence elements and a control method thereof.

2. Description of the Related Art

Image display devices using organic electro-luminescence (EL) elements are known as image display devices using current-driven luminescence elements. The organic EL display devices using self-luminous organic EL elements are best suited to make thinner devices because such organic EL elements do not require backlights conventionally required for liquid crystal display devices. In addition, having no limitation on viewing angle, the organic EL display devices are expected to be practically used as the next-generation display devices. Further, in the organic EL elements used in the organic EL display devices, luminance of each luminescence element is controlled according to current value of current flowing therein. This differs from liquid crystal cells each of which is controlled according to voltage to be applied thereto.

In a usual organic EL display device, organic EL elements which serve as pixels are arranged in a matrix pattern. An organic EL display device is called a passive-matrix organic EL display device, in which organic EL elements are provided at intersections of row electrodes (scanning lines) and column electrodes (data lines) and voltages corresponding to data signals are applied between selected row electrodes and the column electrodes to drive the organic EL elements.

On the other hand, switching thin film transistors (TFTs) are provided at intersections of scanning lines and data lines, connected to gates of driving elements, and turned ON through selected scanning lines to allow data signals to be provided to the driving elements via signal lines. An organic EL display device including organic EL elements driven by such driving elements is called an active-matrix organic EL display device.

In the passive-matrix organic EL display device, the organic EL elements connected to the row electrodes (scanning lines) produce luminescence only in a period during which the connected row electrodes are being selected. On the other hand, the active-matrix organic EL display device allows the organic EL elements to keep producing luminescence until next scanning (selection); and thus, there is no reduction in luminance of display in the active-matrix organic EL display device even when the number of scanning lines increases. Accordingly, the active-matrix organic EL display device can be driven at a low voltage, thereby consuming less power. However, in the case of the active-matrix organic EL display device, due to variations in characteristics of driving transistors, even when the same signal is applied, luminance of the organic EL elements is different for each pixel, thereby causing a problem of variations in luminance.

In order to address this problem, Patent Reference 1 (Japanese Unexamined Patent Application Publication No. 2008-203657), for example, discloses a method of compensating for pixel-to-pixel variations in the characteristics using a simple pixel circuit, as the method of compensating for variations in luminance caused due to the characteristic variations of the driving transistors.

FIG. 14 is a diagram showing a circuit configuration of a pixel unit included in a conventional display device disclosed in Patent Reference 1. A display device 500 shown in FIG. 14 includes a pixel array unit 501, a horizontal selector 503, a light scanner 504, and a bias scanner 505. The pixel array unit 501 includes pixel units 502 arranged rows and columns.

The pixel unit 502 is configured with a simple circuit which includes: a luminescence element 508 having a cathode connected to a negative power line 512; a driving transistor 507 having a drain connected to a positive power line 511 and a source connected to an anode of the luminescence element 508; a capacitor 509 connected between a gate and the source of the driving transistor 507; an auxiliary capacitor 510 connected between the source of the driving transistor 507 and a bias line BS; and a sampling transistor 506 which has a gate connected to a scanning line WS and selectively applies a video signal from a signal line SL to the gate of the driving transistor 507. The following describes luminescence operation of the pixel unit 500.

The light scanner 504 supplies a control signal to the scanning line WS, and the horizontal selector 503 supplies reference voltage Vref to the signal line SL. With this, a correction operation is performed whereby voltage corresponding to threshold voltage Vth of the driving transistor 507 is held by the capacitor 509. Then, following this, a writing operation is performed whereby signal potential Vsig of the video signal is written to the capacitor 509.

The bias scanner 505 changes, before the correction operation, potential of the bias line BS and applies coupling voltage to the source of the driving transistor 507 via the auxiliary capacitor 510. By doing so, the bias scanner 505 performs a preparatory operation whereby voltage Vgs between the gate and the source of the driving transistor 507 is initialized to be greater than the threshold voltage Vth.

The pixel unit 502 negatively feeds the drain current of the driving transistor 507 back to the capacitor 509 in the writing operation of the signal voltage Vsig, so that correction is performed on the signal voltage Vsig according to the mobility of the driving transistor 507.

FIG. 15 is a chart showing operation timing of the conventional display device disclosed in Patent Reference 1. FIG. 15 shows operations of the display device for a single pixel row. A single frame period includes a non-luminescence period and a luminescence period. Further, in the non-luminescence period, the correction operations are performed on the threshold voltage Vth and mobility β of the driving transistor 507.

First, at time T1, when the frame period starts, a short control pulse is applied to the scanning line WS, causing the sampling transistor 506 to be in an ON state temporarily. Here, the potential of the signal line SL is reference voltage Vref; and thus, the reference voltage is written to the gate electrode of the driving transistor 507. This causes Vgs of the driving transistor 507 to be equal to or less than Vth, cutting off the driving transistor 507. This causes the luminescence element 508 to be in a non-luminescent state, and from time T1, the display device 500 enters a non-luminescence period.

Next, at time T2, a control signal pulse is applied to the scanning line WS so that the sampling transistor 506 is turned ON.

At time T3 which is immediately after time T2, the bias line BS is changed from high potential to low potential. This decreases the potential of the driving transistor 507 via the auxiliary capacitor 510. As a result, the relationship becomes Vgs>Vth, turning ON the driving transistor 507. Here, the luminescence element 508 is reversely biased. This does not allow current to flow through, and increases the source potential of the driving transistor 507. When Vgs becomes equal to Vth, the driving transistor 507 is cut off, and the correction operation of the threshold voltage is completed.

Next, at time T4, the potential of the signal line SL is changed from the reference voltage Vref to the signal voltage Vsig. Here, since the sampling transistor 506 is in a conductive state, the gate potential of the driving transistor 507 is Vsig. At this time, the luminescence element 508 is in a cut-off state initially; and thus, discharge current Ids that is drain current of the driving transistor 507 flows only through the capacitor 509 where the electrical discharge accordingly starts. After this, by time T5 at which the sampling transistor 506 is turned OFF, the source potential of the driving transistor 507 increases by ΔV. In this way, the signal potential Vsig is added to Vth and written into the capacitor 509. At the same time, the voltage ΔV used for mobility correction is subtracted from the voltage held by the capacitor 509. The above period from time T4 to time T5 is a signal writing period and also is a mobility correction period. As the Vsig increases, the discharge current Ids also increases, thereby increasing the absolute value of the ΔV as well.

FIG. 16 is a graph showing characteristics of discharge current of the capacitor in the mobility correction period. The horizontal axis represents elapse of time after writing of the signal voltage Vsig, that is, elapse of time after time T4, and the vertical axis represents discharge current values. As described above, when the gate potential of the driving transistor 507 is changed from the reference voltage Vref to the signal voltage Vsig at time T4, the discharge current Ids plots discharge curves, such as A1, B1 and C1, in accordance with the magnitude of Vsig. Here, A1 and A2 are discharge curves of the driving transistors in the case where the same magnitude of Vsig is applied to the gates of these driving transistors although these driving transistors have different characteristic parameters of the mobility β. The relationships between B1 and B2, and between C1 and C2 are identical to the relationship between A1 and A2. It can be seen from these discharge curves that, even when the same signal potential is applied, the initial values of the discharge current Ids are different if the characteristic parameters for the mobility β are different; however, the discharge current Ids become almost identical to each other with the elapse of discharge time. For example, the discharge current Ids of A1 and A2 become almost identical at time a, the discharge current Ids of B1 and B2 become almost identical at time b, and the discharge current Ids of C1 and C2 become almost identical at time c. To be more specific, even when the pixel array 501 includes the driving transistors having different characteristic parameters of the mobility β, the drain current of the driving transistor 507 is caused to be discharged, while the gate bias is applied such that the luminescence element 508 does not produce luminescence in the above-mentioned mobility correction period. Accordingly, the correction can be made, with consideration given to the variations in characteristics of the mobility of the driving transistors.

Next, at time T5, the scanning line WS transitions to low level side, turning OFF the sampling transistor 506. This separates the gate of the driving transistor 507 from the signal line SL. At the same time, the drain current of the driving transistor 507 starts to flow through the luminescence element 508. After this, Vgs is maintained constant by the capacitor 509. The value of Vgs here is obtained by correcting the signal voltage Vsig using the threshold voltage Vth and the mobility β.

Lastly, at time T6, the potential of the bias line BS is changed from low back to high, and then the next frame operation is made ready.

As described so far, the display device 500 disclosed in Patent Reference 1 suppresses the variations in luminance caused due to the variations in the threshold voltage Vth and in the mobility β.

SUMMARY OF THE INVENTION

In the display device 500 disclosed in Patent Reference 1, appropriate setting of mobility correction period is important. In the chart showing the operation timing of the display device 500 in FIG. 15, mobility correction using the discharge current Ids starts at time T4 at which the potential of the signal line SL is changed from the reference voltage Vref to the signal voltage Vsig, and mobility correction is completed at time T5 at which the sampling transistor 506 is turned OFF.

However, according to the display device 500 disclosed in Patent Reference 1, the mobility correction period varies in the pixel array unit 501 due to wiring delay of the scanning line WS. Hereinafter, the variation in the mobility correction period is described with reference to FIG. 17.

FIG. 17 is a diagram showing the variation in the mobility correction period in the display device disclosed in Patent Reference 1. In the enlarged view of region R of FIG. 15 shown in FIG. 17, time T4 at which the mobility correction period starts is the time when the signal potential Vsig of the signal line SL rises. On the other hand, time T5 at which the mobility correction period ends is the time when the voltage of the scanning line WS falls. Due to the wiring delay of the scanning line WS, the voltage waveform of the scanning line WS at point P which is closer to the light scanner 504 is a square wave (dashed line in FIG. 17) which reflects the driving voltage of the light scanner 504. On the other hand, the voltage waveform of the scanning line WS at point Q which is farther from the light scanner 504 includes, at the time of rising and falling, waveform rounding (solid line in FIG. 17) which depends on time constant. The signal voltage Vsig rises at time T4, and is applied for each of the scanning lines SL arranged for each pixel column. For this reason, the start time of the mobility correction does not vary with the pixel unit because of the wiring delay of the scanning line SL. Further, the voltage between the gate and the source of the sampling transistor 506 reaches the threshold voltage of the sampling transistor 506 at time T5. At time T5, for example, scanning voltage Vws applied to the gate of the sampling transistor 506 falls to the potential which is the sum of the source potential Vsig of the sampling transistor 506 and the threshold voltage of the sampling transistor 506. Accordingly, the end time of the mobility correction is different at point P and point Q. The mobility correction period from T4 to T5 is T0 at point P as shown in FIG. 17, and is T at point Q as shown in FIG. 17. The difference between the mobility correction period TO at point P and the mobility correction period T at point Q is ΔT that corresponds to the rounding of the voltage waveform of the scanning line WS at the time of falling. As described, due to the wiring delay of the scanning line WS, the mobility correction period T does not actually become the design value T0 of the correction period, which results in causing the variations among the pixel units.

Further, as described above, the end time of mobility correction is, for example, the time when the scanning voltage Vws applied to the gate of the sampling transistor 506 falls to the potential which is the sum of the source potential Vsig of the sampling transistor 506 and the threshold voltage of the sampling transistor 506. Accordingly, the mobility correction period T varies depending on the magnitude of the signal voltage Vsig. Hence, there is a problem that when a wiring delay of the scanning line WS exists, the stated variation in the mobility correction period caused due to the changes in the signal voltage Vsig, which is the video signal, is different among the pixel units. To be more specific, the amount of variation in the mobility correction period T is not constant among the pixel units with respect to a change in the shade of gray to be displayed. This may result in the variation in current of a panel surface, causing poor shading.

In view of the stated problem, the present invention has an object to provide a display panel device and a display device which suppresses the variation in the mobility correction caused due to a wiring delay with respect to all writing voltages, and a control method thereof.

In order to achieve the above object, a display panel device according to an aspect of the present invention is a display panel device, which includes: a luminescence element including a first luminescence electrode and a second luminescence electrode; a first capacitor including a first capacitor electrode and a second capacitor electrode for holding a capacitor voltage; a driver including a gate electrode, a drain electrode, and a source electrode for driving the luminescence element to produce a luminescence by allowing a drain current corresponding to the capacitor voltage to flow through the luminescence element, the gate electrode being connected to the first capacitor electrode, the source electrode being connected to the first luminescence electrode; a first power line for determining a potential of the drain electrode of the driver; a second power line electrically connected to the second luminescence electrode; a data line for supplying a signal voltage to the first capacitor; a first switch switchably interconnecting the data line and the first capacitor electrode; a second switch switchably interconnecting the source electrode of the driver and the second capacitor electrode; and a controller for controlling the first switch and the second switch, wherein the controller is configured to: turn ON the second switch to interconnect the source electrode of the driver and the second capacitor electrode, and, when the second switch is in an ON state, turn ON the first switch to interconnect the data line and the first capacitor electrode to supply the signal voltage to the first capacitor and flow a current between the source electrode of the driver and the second capacitor electrode; and turn OFF the second switch after an elapse of a predetermined time period after the signal voltage is supplied to the first capacitor to cause non-conduction between the source electrode of the driver and the second capacitor electrode, whereby a charge accumulated in the first capacitor is discharged when the current flows between the source electrode of the driver and the second capacitor electrode during the predetermined time period.

With the display panel device, the display device, and the control method thereof in the present invention, the influence due to the wiring delay can be lowered by reducing the variation caused in the mobility correction period corresponding to the shade of gray to be displayed. Accordingly, the variation in the mobility correction can be suppressed with respect to all shades of gray.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings.

DESCRIPTION OF THE PREFERRED EMBODIMENT(S)

Figure 1:
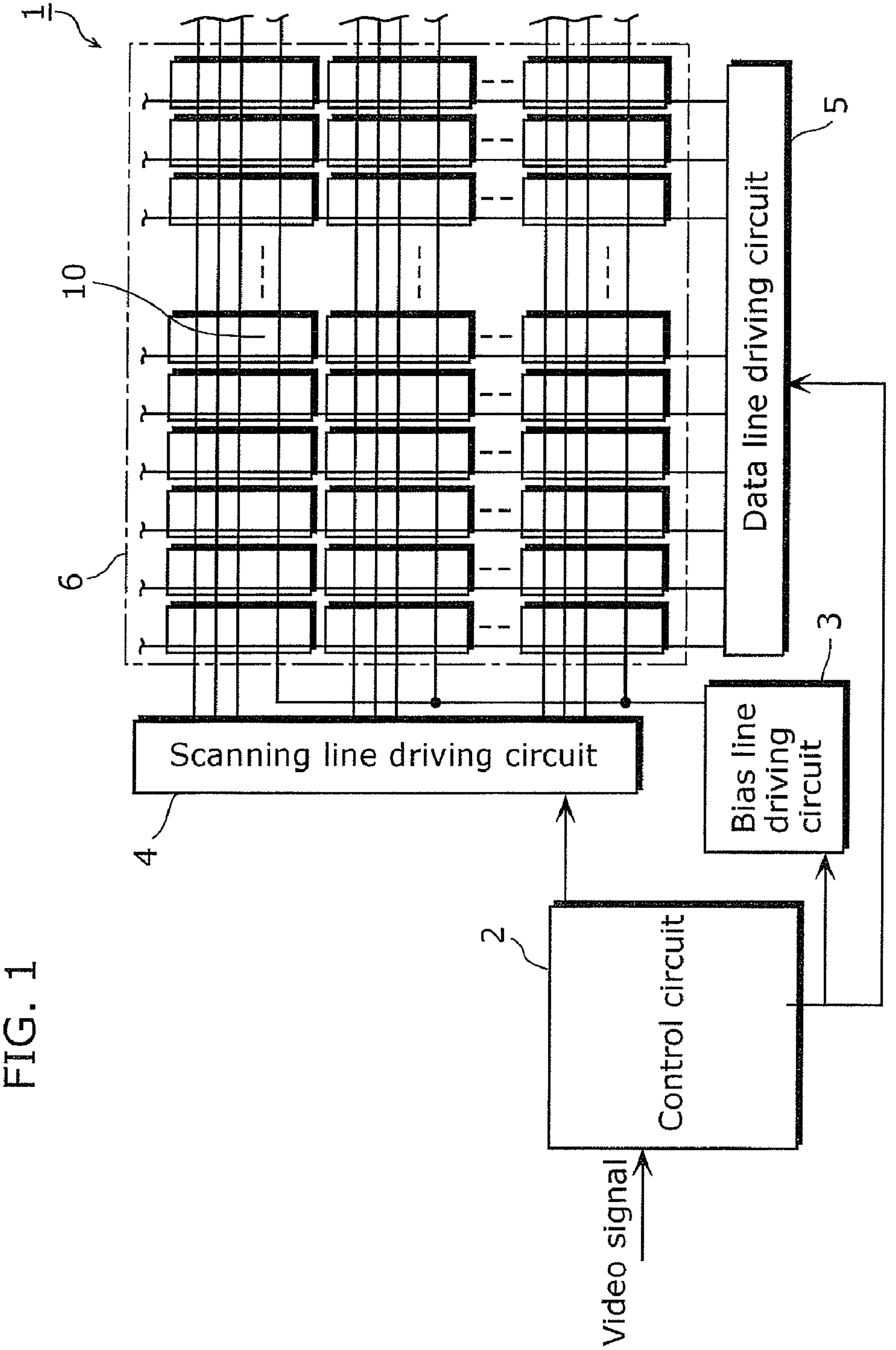
FIG. 1 is a block diagram showing an electrical configuration of a display panel device according to the present invention.

A display panel device according to an implementation of the present invention is a display panel device which includes: a luminescence element including a first luminescence electrode and a second luminescence electrode; a first capacitor including a first capacitor electrode and a second capacitor electrode for holding a capacitor voltage; a driver including a gate electrode, a drain electrode, and a source electrode for driving the luminescence element to produce a luminescence by allowing a drain current corresponding to the capacitor voltage to flow through the luminescence element, the gate electrode being connected to the first capacitor electrode, the source electrode being connected to the first luminescence electrode; a first power line for determining a potential of the drain electrode of the driver; a second power line electrically connected to the second luminescence electrode; a data line for supplying a signal voltage to the first capacitor; a first switch switchably interconnecting the data line and the first capacitor electrode; a second switch switchably interconnecting the source electrode of the driver and the second capacitor electrode; and a controller for controlling the first switch and the second switch, wherein the controller is configured to: turn ON the second switch to interconnect the source electrode of the driver and the second capacitor electrode, and, when the second switch is in an ON state, turn ON the first switch to interconnect the data line and the first capacitor electrode to supply the signal voltage to the first capacitor and flow a current between the source electrode of the driver and the second capacitor electrode; and turn OFF the second switch after an elapse of a predetermined time period after the signal voltage is supplied to the first capacitor to cause non-conduction between the source electrode of the driver and the second capacitor electrode, whereby a charge accumulated in the first capacitor is discharged when the current flows between the source electrode of the driver and the second capacitor electrode during the predetermined time period.

According to the implementation, the second switch is controlled so that conduction between the source electrode of the driver and the second capacitor electrode of the first capacitor is caused. Then, the first switch is turned ON so that the signal voltage is supplied to the first capacitor electrode of the first capacitor and that discharge current flows between the source electrode of the driver and the second capacitor electrode of the first capacitor. Accordingly, using the discharge current, the mobility correction of the driver starts at the same time of writing of the signal voltage into the first capacitor.

Then, after an elapse of predetermined time period after the signal voltage is supplied to the first capacitor electrode of the first capacitor, the second switch is turned OFF so that non-conduction is caused between the source electrode of the driver and the second capacitor electrode of the first capacitor. With this, the mobility correction of the driver using the discharge current ends.

Accordingly, start of the mobility correction of the driver using the discharge current is controlled by control of supply of the signal voltage to the first capacitor. On the other hand, end of the mobility correction of the driver using the discharge current is controlled by control of the second switch. This is performed separately from the control of supply of the signal voltage to the first capacitor. More specifically, the controls of start and end of the mobility correction of the driver using the discharge current are performed by controls of different switches. Therefore, it is possible to precisely control predetermined time period from when the signal voltage starts to be supplied to the first capacitor electrode of the first capacitor by controlling the first switch until non-conduction is caused between the source electrode of the driver and the second capacitor electrode of the first capacitor by controlling the second switch. As a result, it is possible to precisely control duration during which the charge accumulated in the first capacitor is caused to be discharged using the discharge current flowing between the source electrode of the driver and the second capacitor electrode of the first capacitor, thereby precisely correcting the mobility of the driver.

Further, by starting mobility correction of the driver using the discharge current at the same time of writing of the signal voltage to the first capacitor, it is possible to reduce writing processing period of the signal voltage to the first capacitor and processing period of mobility correction of the driver using the discharge current. This is particularly useful for a display panel device with an increased pixel count for a larger screen which does not allow enough writing period and mobility correction for each pixel.

Further, the display panel device according to the implementation of the present invention may further include: a second capacitor connected to the second capacitor electrode; and a bias voltage line for supplying, to the second capacitor, a reverse bias voltage which generates, in the first capacitor, a capacitor potential difference that is greater than a driver threshold voltage of the driver, wherein the controller is further configured to: turn ON the second switch to interconnect the source electrode of the driver and the second capacitor electrode, and turn ON the first switch to supply the reverse bias voltage to the second capacitor while a fixed voltage for fixing a voltage of the first capacitor electrode is supplied from the data line, the reverse bias voltage generating, in the first capacitor, the capacitor potential difference that is greater than the driver threshold voltage; and turn ON the first switch while the driver is in an OFF state and the second switch is in the ON state to supply the signal voltage to the first capacitor electrode after the capacitor potential difference reaches the driver threshold voltage and the driver is in the OFF state.

According to the implementation, the reverse bias voltage is written into the second capacitor while the fixed voltage is being supplied for fixing the voltage of the first capacitor electrode of the first capacitor by controlling the first switch. The reverse bias voltage generates, in the first capacitor, potential difference greater than the threshold voltage of the driver. Then, there is an interval of time period longer than the time period taken for the potential difference between the first capacitor electrode and the second capacitor electrode of the first capacitor to reach the threshold voltage of the driver. As a result, charge corresponding to the threshold voltage of the driver is accumulated in the first capacitor. In addition, during this period before the threshold voltage is reached, the source electrode of the driver is reversely biased by the second capacitor; and thus, the drain current of the driver does not flow through the luminescence element.

When the potential difference between the both end electrodes of the first capacitor becomes the threshold voltage of the driver, the drain current of the driver stops flowing. In this state, the signal voltage starts to be supplied to the first capacitor electrode of the first capacitor. Accordingly, the charge corresponding to the threshold voltage of the driver is accumulated in the first capacitor.

In this way, after the threshold voltage of the driver is held by the first capacitor, the signal voltage is supplied to the first capacitor electrode of the first capacitor; and thus, it is possible to accumulate, in the first capacitor, desired potential difference in which the video signal is reflected and the variations in characteristics of the driver are corrected. As a result, by causing the drain current corresponding to the desired potential difference to flow between the first power line and the second power line, it is possible to precisely control the luminescence amount of the luminescence element.

Further, in the display panel device according to the implementation of the present invention, it may be that the controller further: turns ON the first switch to supply the reverse bias voltage to the second capacitor while the fixed voltage for fixing the voltage of the first capacitor electrode is supplied from the data line, the reverse bias voltage generating, in the first capacitor, the capacitor potential difference that is greater than the driver threshold voltage; turns OFF the first switch; and turns ON the first switch while the driver is in the OFF state and the second switch is in the ON state to supply the signal voltage to the first capacitor electrode after the capacitor potential difference reaches the driver threshold voltage and the driver is in the OFF state.

According to the implementation, the first switch is turned ON so that the reverse bias voltage is written to the second capacitor while the fixed voltage is being supplied from the data line. After the threshold voltage of the driver is held by the first capacitor, the first switch is turned OFF. Here, the voltage between the gate and the source of the driver is maintained to be the threshold voltage, and the driver is in an OFF state. In this state, the first switch is turned ON at predetermined timing so that the signal voltage starts to be supplied to the first capacitor electrode of the first capacitor. This is the start time of mobility correction. It is possible to adjust time period between the charge accumulation period of the threshold voltage to the first capacitor and the mobility correction period, by controlling the first switch.

Further, in the display panel device according to the implementation of the present invention, it may be that the fixed voltage is set such that, after the capacitor potential difference reaches the driver threshold voltage and the driver is in the OFF state, a luminescence potential difference between the first luminescence electrode and the second luminescence electrode becomes lower than a luminescence threshold voltage of the luminescence element at which the luminescence element produces the luminescence.

Using the discharge current, mobility correction of the driver is performed in predetermined time period from when the current is caused to flow between the source electrode of the driver and the second capacitor electrode of the first capacitor by controlling the first switch to supply the signal voltage to the first capacitor electrode of the first capacitor until non-conduction is caused between the source electrode of the driver and the second capacitor electrode of the first capacitor by controlling the second switch.

On the other hand, in the predetermined period, conduction is caused between the source electrode of the driver and the second capacitor electrode of the first capacitor; and thus, in the case where the current flows through the luminescence element and the luminescence element produces luminescence before the end of the mobility correction of the driver, the desired potential difference to be obtained by the mobility correction is not held by the first capacitor. This does not allow precise correction of the variations in luminescence among the pixels caused by the luminescence elements.

According to the implementation, the controller controls the second switching circuit after a predetermined time period after the signal voltage is supplied to the first capacitor electrode of the first capacitor so that non-conduction is caused between the source electrode of the driver and the second capacitor electrode of the first capacitor. The voltage value of the fixed voltage is set in advance such that the potential difference between the first luminescence electrode and the second luminescence electrode of the luminescence element becomes, in the above mobility correction period, the voltage lower than the threshold voltage of the luminescence element at which the luminescence element starts producing luminescence. With this, in a state where conduction is caused between the source electrode of the driver and the second capacitor electrode of the first capacitor, the voltage at the node of the source electrode of the driver and the first luminescence electrode of the luminescence element does not exceed the threshold voltage of the luminescence element at which the luminescence element starts producing luminescence, at the same time of the supply of the signal voltage to the first capacitor electrode of the first capacitor. Therefore, even if conduction is caused between the source electrode of the driver and the second capacitor electrode of the first capacitor in the mobility correction period, the current is prevented from flowing through the luminescence element. This can prevent the luminescence element from producing luminescence before the end of the mobility correction of the driving transistor. As a result, the variations in luminescence among the pixels caused by the luminescence elements can be precisely corrected.

Further, the display panel device according to the implementation may further include a third power line for supplying, to the second capacitor electrode, a reference voltage which generates, in the first capacitor, a capacitor potential difference that is greater than a driver threshold voltage of the driver; and a third switch switchably interconnecting the second capacitor electrode and the third power line, wherein the controller further turns ON the third switch to interconnect the second capacitor electrode and the third power line to supply the reference voltage to the second capacitor electrode; turns ON the first switch to supply a fixed voltage for fixing a voltage of the first capacitor electrode from the data line, and turns ON the first switch while the second switch is in the ON state and the driver is in an OFF state to supply the signal voltage to the first capacitor electrode after the capacitor potential difference reaches the driver threshold voltage and the driver is in the OFF state.

According to the implementation, the reference voltage is supplied to the second capacitor electrode of the first capacitor by controlling the third switch, and the fixed voltage for fixing the voltage of the first capacitor electrode of the first capacitor is supplied by controlling the first switch. Then, there is an interval of time period longer than time period taken for the potential difference between the first capacitor electrode and the second capacitor electrode of the first capacitor to reach the threshold voltage of the driver. Accordingly, the potential difference between the first capacitor electrode and the second capacitor electrode of the first capacitor is set to be the threshold voltage of the driver. Further, during this period before the threshold voltage is reached, the drain current of the driver does not flow through the luminescence element because the gate electrode of the driver is set in advance to be the fixed voltage.

When the threshold voltage of the driver is held by the first capacitor, current between the drain electrode and the source electrode of the driver stops flowing. In this state, the signal voltage starts to be supplied to the first capacitor electrode of the first capacitor. As a result, the charge corresponding to the signal voltage for which the threshold voltage of the driver is corrected is accumulated in the first capacitor.

As described, after the threshold voltage of the driver is held by the first capacitor, the signal voltage is supplied to the first capacitor electrode of the first capacitor; and thus, it is possible to accumulate, in the first capacitor, desired potential difference in which the video signal is reflected and the variations in characteristics of the driver is corrected. As a result, current corresponding to the desired potential difference flows between the first power line and the second power line, allowing precise control of the luminescence amount of the luminescence element.

Further, in the display panel device according to the implementation of the present invention, it may be that the third power line is a scanning line, and the scanning line turns ON and turns OFF the first switch, and the scanning line supplies the reference voltage to turn OFF the first switch.

According to the implementation, as a preliminary step of detecting the threshold voltage of the driver, the voltage of the scanning line which controls the first switch is used as the reference voltage to be applied to the second capacitor electrode of the first capacitor. Here, the reference voltage generates, in the first capacitor, potential difference greater than the threshold voltage of the driver by the fixed voltage supplied from the data line. Here, for the reference voltage, voltage of the scanning line used for turning OFF the first switch is used. This causes the drain current corresponding to the desired potential difference to flow between the first power line and the second power line, thereby precisely controlling the luminescence amount of the luminescence element. In addition, simplification of the pixel circuit is also possible.

Further, in the display panel device according to the implementation of the present invention, it may be that a first time constant for turning ON and turning OFF the first switch is at least equal to a second time constant for turning ON and turning OFF the second switch.

Large display panel requires wiring connections to many pixel units. This increases resistance of wiring and parasitic capacity. Therefore, in the case where control circuits are provided on both sides of the display panel, control of each switch delays in the region closer to center of the display panel compared to the end regions of the display panel.

Here, when amount of delay of control of the first switch and amount of delay of control of the second switch are different, the predetermined time period determined by control of the first and the second switch may vary. If such variation of predetermined time period differs in the center region and the surrounding region, mobility correction using the discharge current also varies within the display panel. This results in variations in quality of the display image.

According to the implementation, the second time constant included in the second switch is set to be equal to or less than the first time constant included in the first switch. With this, it is possible to reduce variation in the mobility correction period from when the signal voltage is supplied to the first capacitor electrode of the first capacitor after conduction is caused between the source electrode of the driver and the second capacitor electrode of the first capacitor until non-conduction is caused between the source electrode of the driver and the second capacitor electrode of the first capacitor by controlling the second switch, compared to conventional variation in the predetermined time period from when the signal voltage is supplied to the first capacitor electrode of the first capacitor after conduction is caused between the source electrode of the driver and the second capacitor electrode of the first capacitor until non-conduction is caused between the data line and the gate electrode of the driver by controlling the first switch. Accordingly, it is possible to precisely control the mobility correction period, thereby precisely correcting mobility of the driver using the discharge current.

Further, the display device according to an implementation of the present invention may include the display panel device; and a power source that supplies power to the first power line and the second power line, wherein the luminescence element further includes a luminescent layer sandwiched between the first luminescence electrode and the second luminescence electrode, and a plurality of luminescence elements including the luminescence element is arranged in a matrix pattern.

Further, the display device according to an implementation of the present invention, a display device includes the display panel device; and a power source that supplies power to the first power line and the second power line, wherein the luminescence element further includes a luminescent layer sandwiched between the first luminescence electrode and the second luminescence electrode, a pixel includes the luminescence element, the first capacitor, the driver, the first switch, and the second switch, and a plurality of pixels including the pixel are arranged in a matrix pattern.

Further, in the display device according to the implementation of the present invention, the luminescence element may be an organic electroluminescence element.

Further, a method of controlling a display device according to an implementation of the present invention, in which the display device includes: a luminescence element having a first luminescence electrode and a second luminescence electrode; a first capacitor having a first capacitor electrode and a second capacitor electrode for holding a capacitor voltage; a driver having a gate electrode, a drain electrode, and a source electrode for driving the luminescence element to produce a luminescence by allowing a drain current corresponding to the capacitor voltage to flow through the luminescence element, the gate electrode being connected to the first capacitor electrode, the source electrode being connected to the first luminescence electrode; a first power line for determining a potential of the drain electrode of the driver; a second power line electrically connected to the second luminescence electrode; a data line for supplying a signal voltage to the first capacitor; a first switch switchably interconnecting the data line and the first capacitor electrode; and a second switch switchably interconnecting the source electrode of the driver and the second capacitor electrode, and the method including: turning ON the second switch to interconnect the source electrode of the driver and the second capacitor electrode, and, when the second switch is in an ON state, turning ON the first switch to interconnect the data line and the first capacitor electrode to supply the signal voltage to the first capacitor and flow a current between the source electrode of the driver and the second capacitor electrode; and turning OFF the second switch after an elapse of a predetermined time period after the signal voltage is supplied to the first capacitor to cause non-conduction between the source electrode of the driver and the second capacitor electrode, whereby a charge accumulated in the first capacitor is discharged when the current flows between the source electrode of the driver and the second capacitor electrode during the predetermined time period.

Hereinafter, preferred embodiments in the present invention are described with reference to the drawings. In the following descriptions, the same or equivalent elements are assigned with the same reference numerals throughout the drawings, and the same descriptions are not repeated.

(Embodiment 1)

A display panel device according to an implementation of the present embodiment includes: organic EL elements; capacitors; driving transistors which cause drain current corresponding to voltage held by the capacitors to flow through the organic EL elements; data lines for supplying signal voltage; selecting transistors which switch between conduction and non-conduction between the data lines and the first capacitor electrodes of the capacitors; switching transistors which switch conduction and non-conduction between the source electrodes of the driving transistors and the second capacitor electrodes of first capacitors; and controllers.

The controller turns ON the switching transistor so that conduction is caused between the source electrode of the driving transistor and the second capacitor electrode of the capacitor. Then, the selecting transistor is turned ON so that signal voltage is supplied to the first capacitor electrode of the capacitor and that drain current of the driving transistor flows between the source electrode of the driving transistor and the second capacitor electrode of the capacitor. Then, after an elapse of predetermined time period after the signal voltage is supplied to the first capacitor electrode of the capacitor, the switching transistor is turned OFF so that non-conduction is caused between the source electrode of the driving transistor and the second capacitor electrode of the capacitor. This causes the charge accumulated in the capacitor to be discharged using the current flowing between the source electrode of the driving transistor and the second capacitor electrode of the capacitor during the predetermined time period.

With this, mobility correction of the driving transistor using the discharge starts at the same time of writing of the signal voltage into the capacitor. After an elapse of the predetermined time period, the switching transistor is turned OFF so that the mobility correction of the driving transistor using the discharge ends. As a result, it is possible to precisely control duration during which the charge accumulated in the capacitor is caused to be discharged using the current flowing between the source electrode of the driving transistor and the second capacitor electrode of the capacitor, thereby precisely correcting the mobility of the driver.

Hereinafter, Embodiment 1 of the present invention is described with reference to the drawings.

FIG. 1 is a block diagram showing an electrical configuration of a display panel device according to the present invention. A display panel device 1 in FIG. 1 includes: a control circuit 2; a bias line driving circuit 3; a scanning line driving circuit 4; a data line driving circuit 5; and a display unit 6. The display unit 6 includes luminescent pixels 10 arranged in a matrix pattern.

Figure 2:
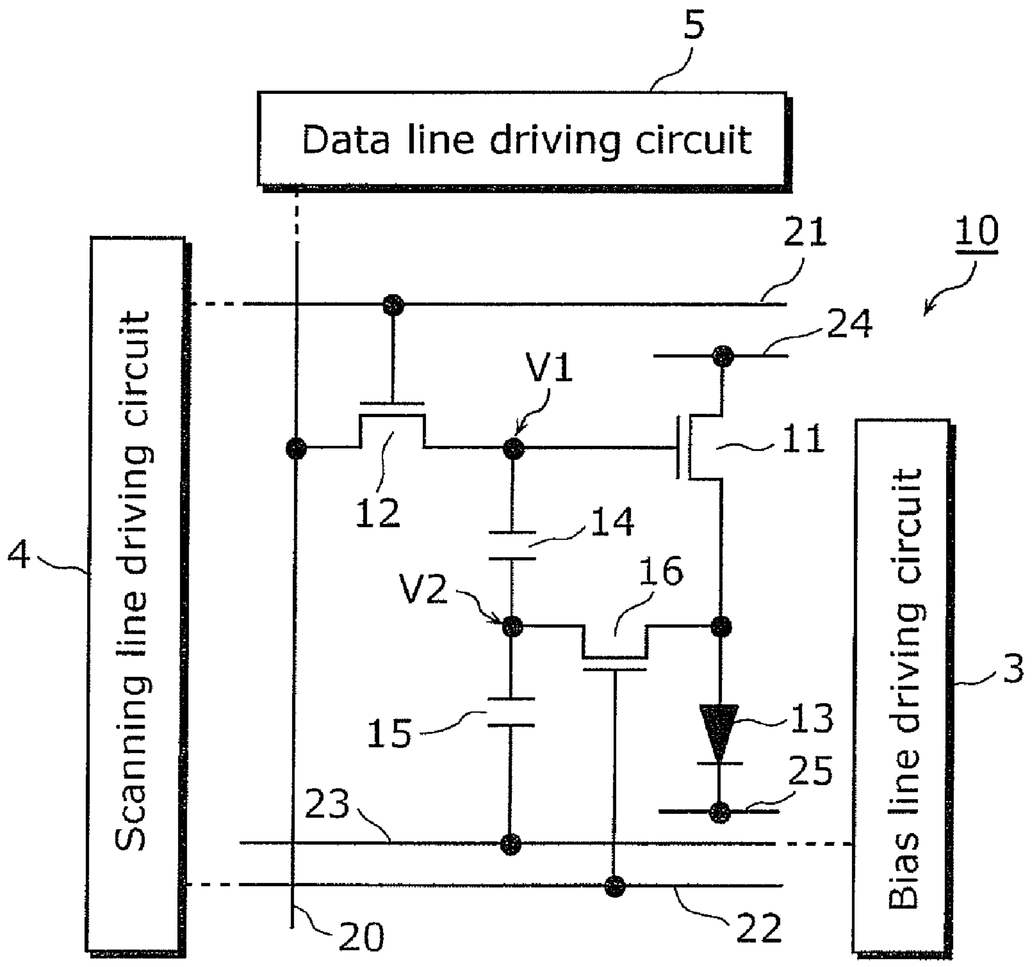
FIG. 2 is a diagram showing a circuit configuration of a luminescence pixel included in a display unit and connections with the surrounding circuits according to Embodiment 1 of the present invention.

In addition, FIG. 2 is a diagram showing a circuit configuration of a luminescence pixel included in a display unit and connections with the surrounding circuits according to Embodiment 1 of the present invention. The luminescence pixel 10 in FIG. 2 includes: a driving transistor 11; a selecting transistor 12, an organic EL element 13; capacitors 14 and 15; a switching transistor 16; a data line 20; scanning lines 21 and 22; a bias line 23, a positive power line 24; and a negative power line 25. Further, the surrounding circuits include the bias line driving circuit 3, the scanning line driving circuit 4, and the data line driving circuit 5.

The following descriptions are given of connection relationships and functions of the structural elements shown in FIG. 1 and FIG. 2.

The control circuit 2 functions to control the bias line driving circuit 3, the scanning line driving circuit 4, and the data line driving circuit 5. The control circuit 2 converts a video signal provided from outside into a voltage signal based on correction data or the like, and provides the resultant to the data line driving circuit 5.

The scanning line driving circuit 4 is connected to the scanning lines 21 and 22, and functions as a controller which switches between conduction and non-conduction between the selecting transistor 12 and the switching transistor 16 that are included in the luminescence pixel 10 by providing a scanning signal to the scanning lines 21 and 22.

The data line driving circuit 5 is connected to the data line 20, and functions as a controller which provides signal voltage based on a video signal to the luminescence pixel 10.

The bias line driving circuit 3 is connected to the bias line 23, and functions as a controller which applies reverse bias voltage to the capacitor 15 via the bias line 23.

The display unit 6 includes luminescence pixels 10, and displays an image based on the video signal provided from outside to the display panel device 1.

The driving transistor 11 is a driver having a gate connected to a source electrode of the selecting transistor 12, a drain electrode connected to the positive power line 24 that is a first power line, and a source electrode connected to an anode electrode of the organic EL element 13. The driving transistor 11 converts voltage corresponding to the signal voltage applied between the gate and the source into drain current corresponding to the signal voltage. Subsequently, this drain current is supplied to the organic EL element 13 as signal current. The driving transistor 11 is, for example, configured with an n-type thin film transistor (n-type TFT).

The selecting transistor 12 is a first switch having a gate electrode connected to the scanning line 21, a drain electrode connected to the data line 20, and a source electrode connected to the first capacitor electrode of the capacitor 14. The selecting transistor 12 functions to determine timing at which the signal voltage and fixed voltage of the data line 20 are applied to the first capacitor electrode of the capacitor 14.

The organic EL element 13 is a luminescence element having a cathode electrode connected to a negative power line 25 that is a second power line. The organic EL element 13 produces luminescence according to the aforementioned signal current flowing from the driving transistor 11.

The capacitor 14 is a first capacitor having a first capacitor electrode connected to the gate electrode of the driving transistor 11, and a second capacitor electrode connected to the source electrode of the switching transistor 16. The capacitor 14 holds the voltage corresponding to the signal voltage supplied from the data line 20. For example, after the selecting transistor 12 is turned OFF, the capacitor 14 functions to stably hold the voltage between the gate and the source of the driving transistor 11, and to stabilize the drain current to be supplied from the driving transistor 11 to the organic EL element 13.

The capacitor 15 is a second capacitor connected between the second capacitor electrode of the capacitor 14 and the bias line 23. The capacitor 15 functions to determine the potential of the second capacitor electrode of the capacitor 14 through the application of voltage from the bias line 23, and also functions to determine the source potential of the driving transistor 11 in a state where the switching transistor 16 is in a conductive state. With such functions, it is possible to generate in the capacitor 14 potential difference greater than the threshold voltage of the driving transistor 11 through application of reverse bias voltage from the bias line 23 via the capacitor 15, even if the voltage applied from the data line 20 is fixed voltage that is not signal voltage. Further, the fixed voltage is set in advance such that the voltage between the anode and the cathode of the organic EL element 13 becomes lower than the threshold voltage of the organic EL element 13 in a threshold voltage detection period from when the fixed voltage is supplied to the first capacitor electrode of the capacitor 14 until predetermined time period is elapsed after the reverse bias voltage is written to the capacitor 15 and in a mobility correction period from when the signal voltage is supplied to the first capacitor electrode of the capacitor 14 until predetermined time period is elapsed. Thus, during the above periods, the drain current of the driving transistor 11 does not flow through the organic EL element 13. Accordingly, periods for correcting threshold voltage Vth and mobility β of the driving transistor 11 can be included before the luminescence period during which the organic EL element 13 produces luminescence.

The switching transistor 16 is a second switch having a gate electrode connected to the scanning line 22, a drain electrode connected to the source electrode of the driving transistor 11, and a source electrode connected to the second capacitor electrode of the capacitor 14. The switching transistor 16 functions to determine timing at which the voltage held by the capacitor 14 is applied between the gate and the source electrodes of the driving transistor 11. Further, by turning ON the switching transistor 16, it is possible not only to start the luminescence period during which the organic EL element 13 produces luminescence, but also to secure a path for current for correcting the threshold voltage and mobility of the driving transistor 11. The switching transistor 16 is, for example, configured with an n-type thin transistor (n-type TFT).

The data line 20 is connected to the data line driving circuit 5, and to each of luminescence pixels belonging to a pixel column including the luminescence pixel 10. The data line 20 functions to supply signal voltage Vdata which determine luminescence intensity and fixed voltage Vreset.

Further, the display panel device 1 includes as many data lines 20 as the number of pixel columns.

The scanning line 21 is connected to the scanning line driving circuit 4, and to each of the luminescence pixels belonging to the pixel row including the luminescence pixel 10. As a result, the scanning line 21 functions to provide timing at which the signal voltage is written to each of the luminescence pixels belonging to the pixel row including the luminescence pixel 10, and also functions to provide timing at which the fixed voltage Vreset is applied to the gate of the driving transistor 11 included in the luminescence pixel.

The scanning line 22 is connected to the scanning line driving circuit 4. The scanning line 22 functions to provide timing at which the potential of the second capacitor electrode of the capacitor 14 is applied to the source electrode of the driving transistor 11, and also functions to provide timing at which a current path for correcting the threshold voltage and mobility of the driving transistor 11 is formed.

The bias line 23 is connected to the bias line driving circuit 3, and functions as a bias voltage line applying, to the second capacitor electrode of the capacitor 14 via the capacitor 15, the voltage supplied from the bias line driving circuit 3.

Further, the display panel device 1 includes as many scanning lines 21 and 22 and bias line 23 as the number of pixels rows.

Note that the positive power line 24 that is a first power line and the negative power line 25 that is a second power line are also connected to other luminescence pixels and to the voltage source.

Note that a display device which includes the display panel device 1 and the above voltage source according to the present embodiment is also an implementation of embodiments of the present invention.

Figure 3:
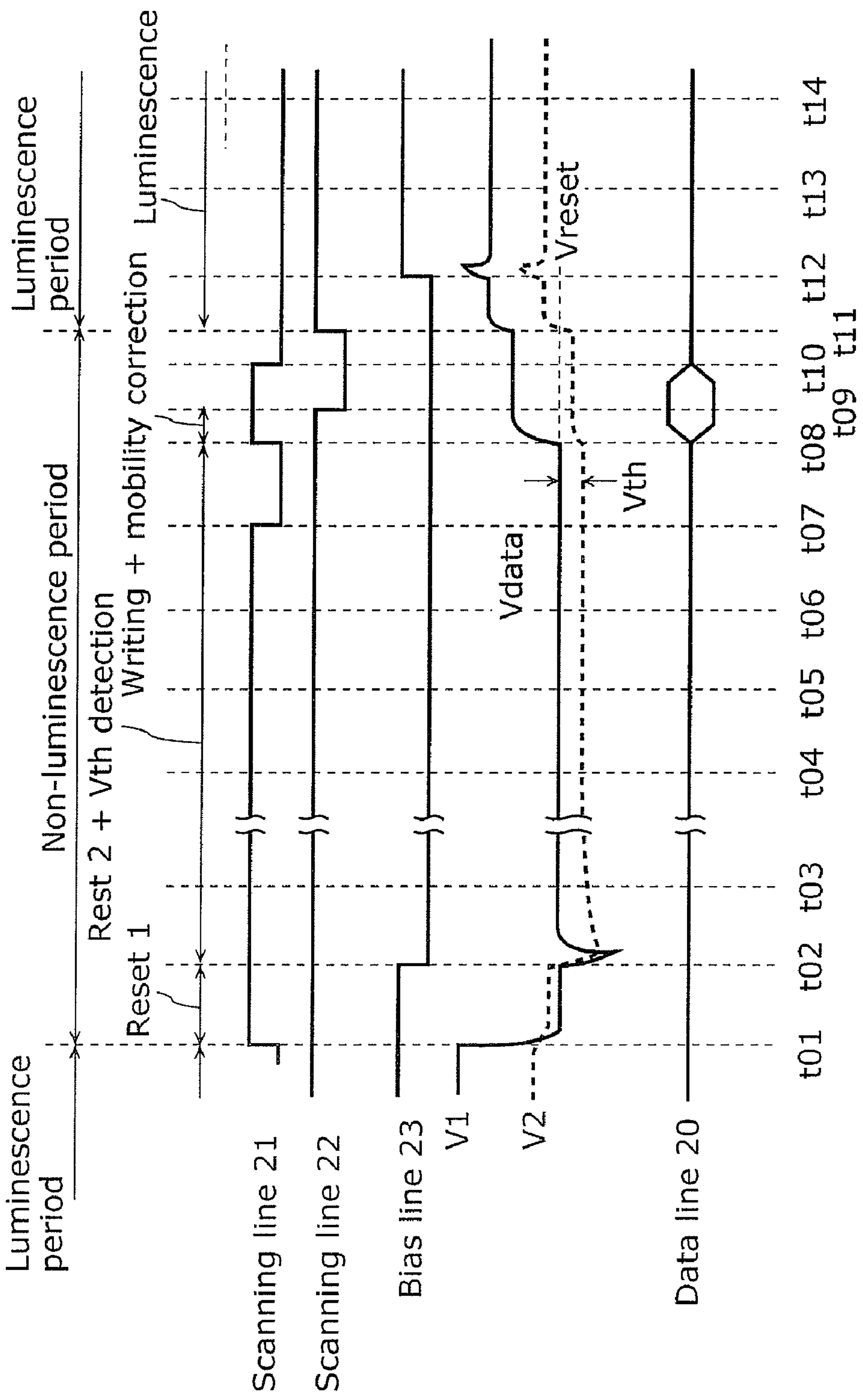
FIG. 3 is a chart showing operation timings in a control method of the display panel device according to Embodiment 1 of the present invention.
Figure 4:
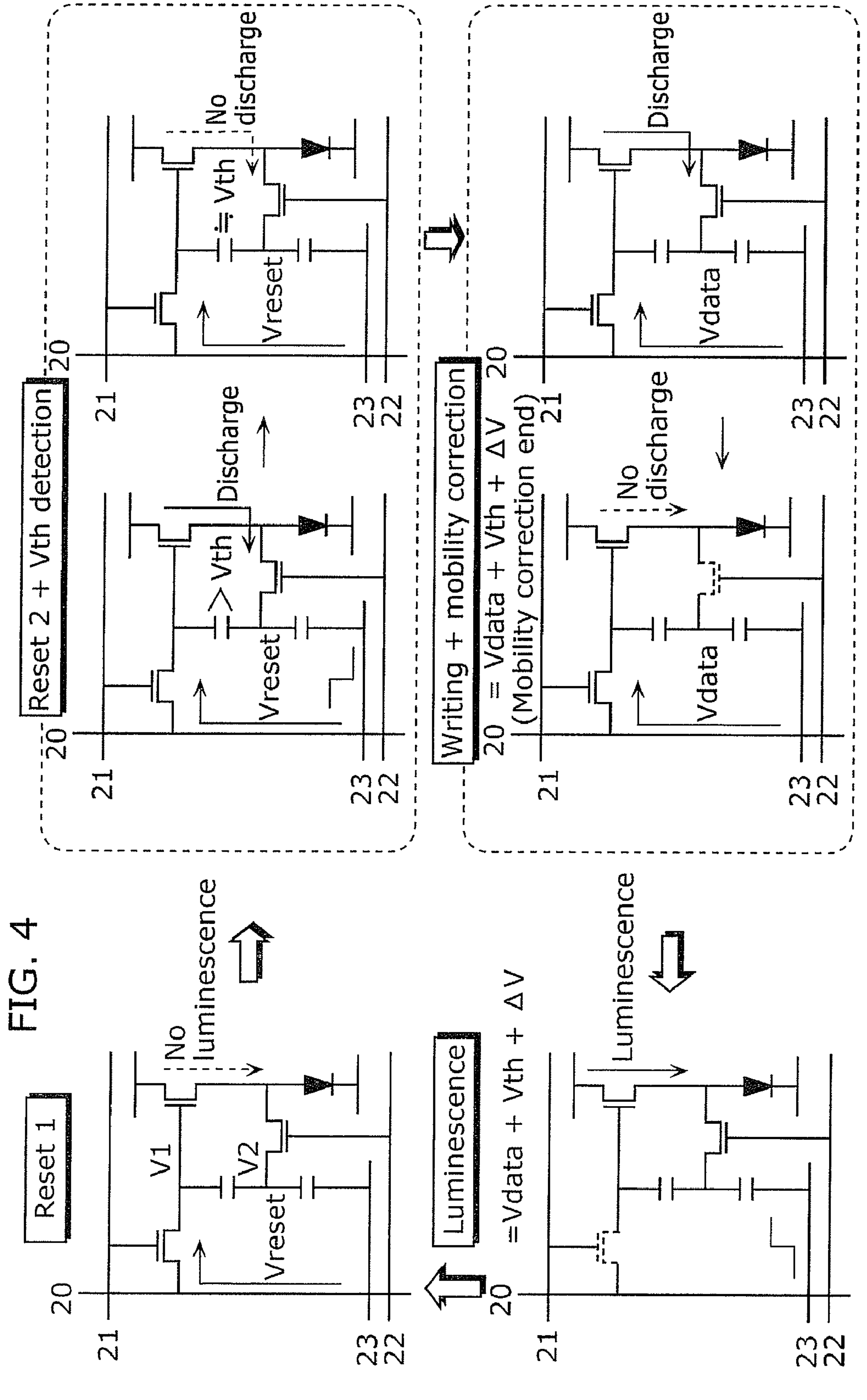
FIG. 4 is a diagram showing state transition of the pixel circuit included in the display panel device according to Embodiment 1 of the present invention.

Next, the following describes a control method of the display device according to the present embodiment with reference to FIG. 3 and FIG. 4.

FIG. 3 is a chart showing operation timings in a control method of the display device according to Embodiment 1 of the present invention. In FIG. 3, the horizontal axis represents time. Furthermore, in the vertical direction, waveforms of voltages generated in the scanning line 21, the scanning line 22, the bias line 23, the potential V1 of the first capacitor electrode of the capacitor 14, the potential V2 of the second capacitor electrode of the capacitor 14, and the data line 20 are shown from top to bottom in this order. FIG. 3 shows operations of the display device for a single pixel row. A single frame period includes a non-luminescence period and a luminescence period. Further, in the non-luminescence period, correction operations are performed on the threshold voltage Vth and mobility β of the driving transistor 11.

Further, FIG. 4 is a diagram showing state transition of a pixel circuit included in the display device according to Embodiment 1 of the present invention.

First, at time t01, the scanning line driving circuit 4 changes the voltage level of the scanning line 21 from low to high so that the selecting transistor 12 is turned ON. As a result, fixed voltage Vreset is applied to the gate electrode (V1) of the driving transistor 11 via the data line 20. Here, the switching transistor 16 is in an ON state, and the capacitor 15 is in a state where reverse bias voltage is not being applied. Accordingly, the luminescence period of a preceding frame ends. The period from time t01 to time t02 is a state where luminescence is not being produced, and corresponds to the state of reset 1 in FIG. 4.

Next, at time t02, the bias line driving circuit 3 applies reverse bias voltage to the capacitor 15 via the bias line 23. Here, the fixed voltage Vreset is continuously being supplied from the data line 20 to the first capacitor electrode of the capacitor 14. This fixed voltage Vreset and the reverse bias voltage generate potential difference greater than the threshold voltage Vth of the driving transistor 11, in both end electrodes of the capacitor 14. As a result, the driving transistor 11 is turned ON, causing the drain current of the driving transistor 11 to flow on a current path of the positive power line 24, the driving transistor 11, the switching transistor 16, and the second capacitor electrode of the capacitor 14. The drain current flows during the period from time t02 to t07, and the drain current stops flowing when the voltage held by the capacitor 14 becomes Vth. Accordingly, the charge corresponding to the threshold Vth is accumulated in the capacitor 14. Further, the reverse bias voltage is set in advance such that the voltage between the anode and the cathode of the organic EL element 13 becomes lower than the threshold voltage of the organic EL element 13 according to the relationship with the fixed voltage. Accordingly, during this period, the source electrode of the driving transistor 11 is reversely biased by the capacitor 15; and thus, the drain current does not flow through the organic EL element 13.

Next, at time t07, the scanning line driving circuit 4 changes the voltage level of the scanning line 21 from high to low so that the selecting transistor 12 is turned OFF. This stops the supply of the fixed voltage Vreset to the first capacitor electrode of the capacitor 14. Here, the voltage between the gate and the source of the driving transistor 11 is maintained to be the threshold voltage Vth, and the driving transistor 11 is in an OFF state. In this state, at time t08, the selecting transistor 12 is turned ON so that the signal voltage Vdata starts to be supplied to the first capacitor electrode of the capacitor 14. In the period from time t07 to time t08, the period between the threshold voltage detection period of the driving transistor 11 and the mobility correction period can be adjusted by controlling the selecting transistor 12. Further, the period from time t02 to time t08 corresponds to the state of the reset 2+Vth detection shown in FIG. 4.

Next, at time t08, the scanning line driving circuit 4 changes the voltage level of the scanning line 21 from low to high so that the selecting transistor 12 is turned ON. Further, the data line driving circuit 5 supplies, via the data line 20, the voltage signal Vdata to the pixel row to which the luminescence pixel 10 is belonging. As a result, the signal voltage Vdata is applied to the gate electrode of the driving transistor 11 via the data line 20. Here, the switching transistor 16 is in an ON state, and the capacitor 15 is in a state where the reverse bias voltage is being applied. Accordingly, the signal voltage Vdata is supplied to the first capacitor electrode of the capacitor 14 in a state where conduction is caused between the source electrode of the driving transistor 11 and the second capacitor electrode of the capacitor 14. This causes discharge current to flow between the source electrode of the driving transistor 11 and the second capacitor electrode of the capacitor 14. With this, at the same time of writing of the signal voltage to the capacitor 14, mobility correction of the driving transistor 11 starts using the discharge current path of the positive power line 24, the driving transistor 11, the switching transistor 16, and the second capacitor electrode of the capacitor 14.

Next, at time t09, the scanning line driving circuit 4 changes the voltage level of the scanning line 22 from high to low so that the switching transistor 16 is turned OFF. More specifically, non-conduction is caused between the source electrode of the driving transistor and the second capacitor electrode of the capacitor 14. This ends the mobility correction of the driving transistor 11 using the discharge current. The period from time t08 to time t09 corresponds to the state of writing+mobility correction shown in FIG. 4.

In the period from time t08 to time t09, the start of mobility correction of the driving transistor 11 using the discharge current is controlled by control of supply of the signal voltage Vdata to the capacitor 14. On the other hand, the end of the mobility correction of the driving transistor 11 using the discharge current is controlled by the control of the switching transistor 16. This is performed separately from the control of supply of the signal voltage Vdata to the capacitor 14. More specifically, the controls of start and end of the mobility correction of the driving transistor 11 using the discharge current are performed by controlling different switches. Therefore, it is possible to precisely control the mobility correction period from when the signal voltage Vdata starts to be supplied to the first capacitor electrode of the capacitor 14 until non-conduction is caused between the source electrode of the driving transistor 11 and the second capacitor electrode of the capacitor 14 through the control of the switching transistor 16. As a result, it is possible to precisely control duration during which the charge accumulated in the capacitor is caused to be discharged using the current flowing between the source electrode of the driving transistor 11 and the second capacitor electrode of the capacitor 14, thereby precisely correcting the mobility of the driving transistor 11. By using the control of the switching transistor 16 for determining the end time of the mobility correction, the mobility correction period can be precisely controlled because of the reasons which will be described later with reference to FIG. 5 and FIG. 6.

Further, in the mobility correction period from when the signal voltage Vdata is supplied to the first capacitor electrode of the capacitor 14 (time t08) until conduction is caused between the source electrode of the driving transistor 11 and the second capacitor electrode of the capacitor 14 (time t09), the voltage value of the fixed voltage Vreset is set in advance such that the voltage at the node of the source electrode of the driving transistor 11 and the first luminescence electrode of the organic EL element 13 is lower than the threshold voltage of the organic EL element 13. With this, the voltage between anode and cathode of the organic EL element 13 does not exceed the threshold voltage of the organic EL element 13 at the same time when the signal voltage Vdata that is a component changed from the fixed voltage Vreset is supplied to the first capacitor electrode of the capacitor 14 in the state where conduction is caused between the source electrode of the driving transistor 11 and the second capacitor electrode of the first capacitor. Therefore, even if conduction is caused between the source electrode of the driving transistor 11 and the second capacitor electrode of the capacitor 14 in the mobility correction period, the current is prevented from flowing through the organic EL element 13. This can prevent the organic EL element 13 from producing luminescence before the end of the mobility correction of the driving transistor. As a result, the variations in luminescence among the pixels caused by the organic EL elements 13 can be precisely corrected.

Further, by starting mobility correction of the driving transistor 11 using the discharge current at the same time of writing of the signal voltage Vdata to the capacitor 14, it is possible to reduce writing processing period of the signal voltage Vdata to the capacitor 14 and processing period of mobility correction of the driving transistor 11 using the discharge current. This is particularly useful for a display panel device with an increased pixel count for a larger screen which does not allow enough writing period and mobility correction period for each pixel.

Next, at time t10, the scanning line driving circuit 4 changes the voltage level of the scanning line 21 from high to low so that the selecting transistor 12 is turned OFF. This stops the supply of the signal voltage Vdata to the first capacitor electrode of the capacitor 14.

Next, at time 11, the scanning line driving circuit 4 changes the voltage level of the scanning line 22 from low to high so that the selecting transistor 16 is turned ON. More specifically, conduction is caused between the source electrode of the driving transistor 11 and the second capacitor electrode of the capacitor 14. This causes the drain current corresponding to the voltage (V1-V2) held by the capacitor 14 to flow through the organic EL element 13, starting luminescence of the organic EL element 13. Here, the voltage (V1-V2) held by the capacitor 14 has a value obtained by correcting the signal voltage Vdata using the threshold voltage Vth and the mobility β.

Finally, the bias line driving circuit 3 releases the reverse bias voltage to the capacitor 15 via the bias line 23. Then, the next frame operation is made ready. Here, the potential of the capacitor 14 varies according to the change of the voltage of the bias line 23; however, the potential difference between the both end electrodes of the capacitor 14 is made to be a constant value. Thus, the drain current determined by the voltage between the gate and the source of the driving transistor 11 does not vary, thereby not causing change in the intensity of luminescence. The period after time t11 corresponds to the state of luminescence shown in FIG. 4

Next, the following describes reasons that the mobility correction period can be precisely controlled in the display panel device and the display device according to the present invention by using the control of the switching transistor 16 for determining the end time of the mobility correction.

Figure 5:
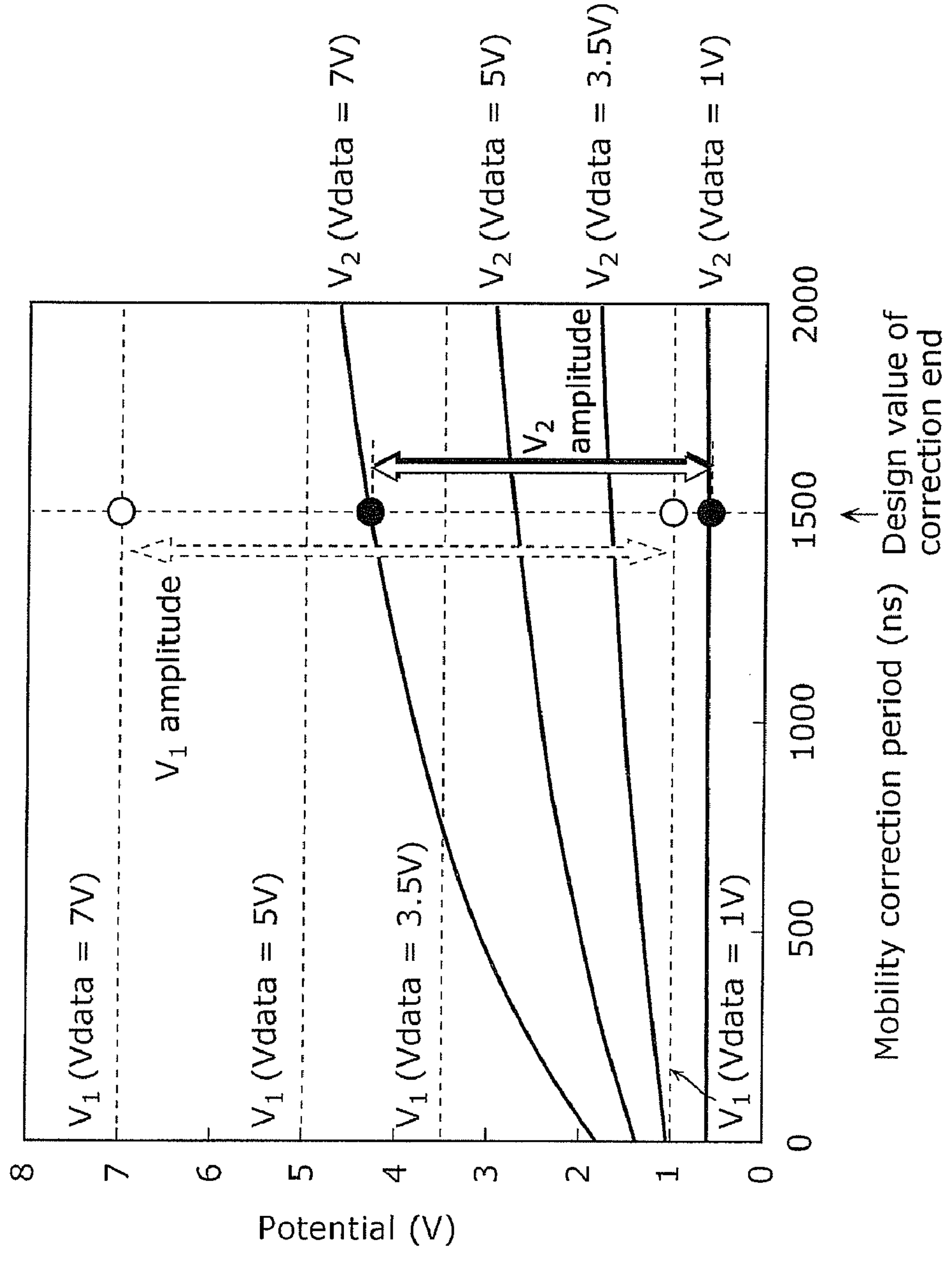
FIG. 5 is a graph showing changes in potential of both end electrodes of the capacitor included in the pixel circuit according to Embodiment 1.

FIG. 5 is a graph showing change in potential of both end electrodes of the capacitor included in the pixel circuit according to Embodiment 1. The horizontal axis represents mobility correction period, and the vertical axis represents potentials V1 and V2 at both ends of the capacitor 14. The mobility correction period in the horizontal axis is a period from when the signal voltage Vdata is applied from the data line 20 to the first capacitor electrode of the capacitor 14. FIG. 5 shows time change of V2 that is potential of the second capacitor electrode of the capacitor 14 in the case where, for example, the signal voltage Vdata is applied to the luminescence pixel 10 in the range of 1V to 7V in accordance with a change in the shade of gray to be displayed. Here, when the design value of the mobility correction period is, for example, 1500 ns, the variation range of V1 is from 1V to 7V, whereas the variation range of V2 is from 0.7V to 4.3 V.

Figure 6:
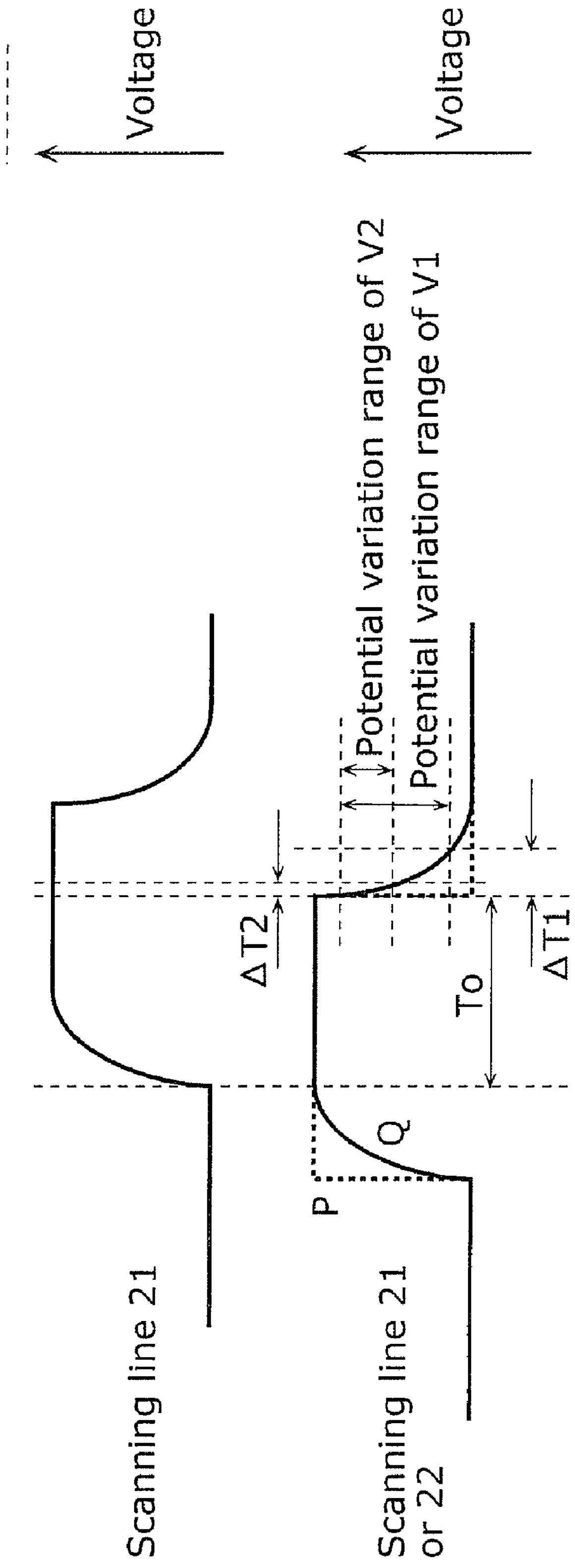
FIG. 6 is a diagram showing comparison of mobility correction period between the display panel device in the present invention and the conventional method.

FIG. 6 is a diagram showing comparison of mobility correction period between the display panel device according to the present invention and the display panel device of the conventional method.

As described earlier, in the conventional method, the start time of the mobility correction period is the time when the selecting transistor is turned OFF in advance, the potential of the data line is changed from the fixed voltage Vreset to the signal voltage Vdata, and the signal voltage Vdata starts to be applied to the gate electrode of the driving transistor. On the other hand, the end time of the mobility correction period is the time when the selecting transistor is changed from its ON state to OFF state after a predetermined discharge is performed.

Figure 17:
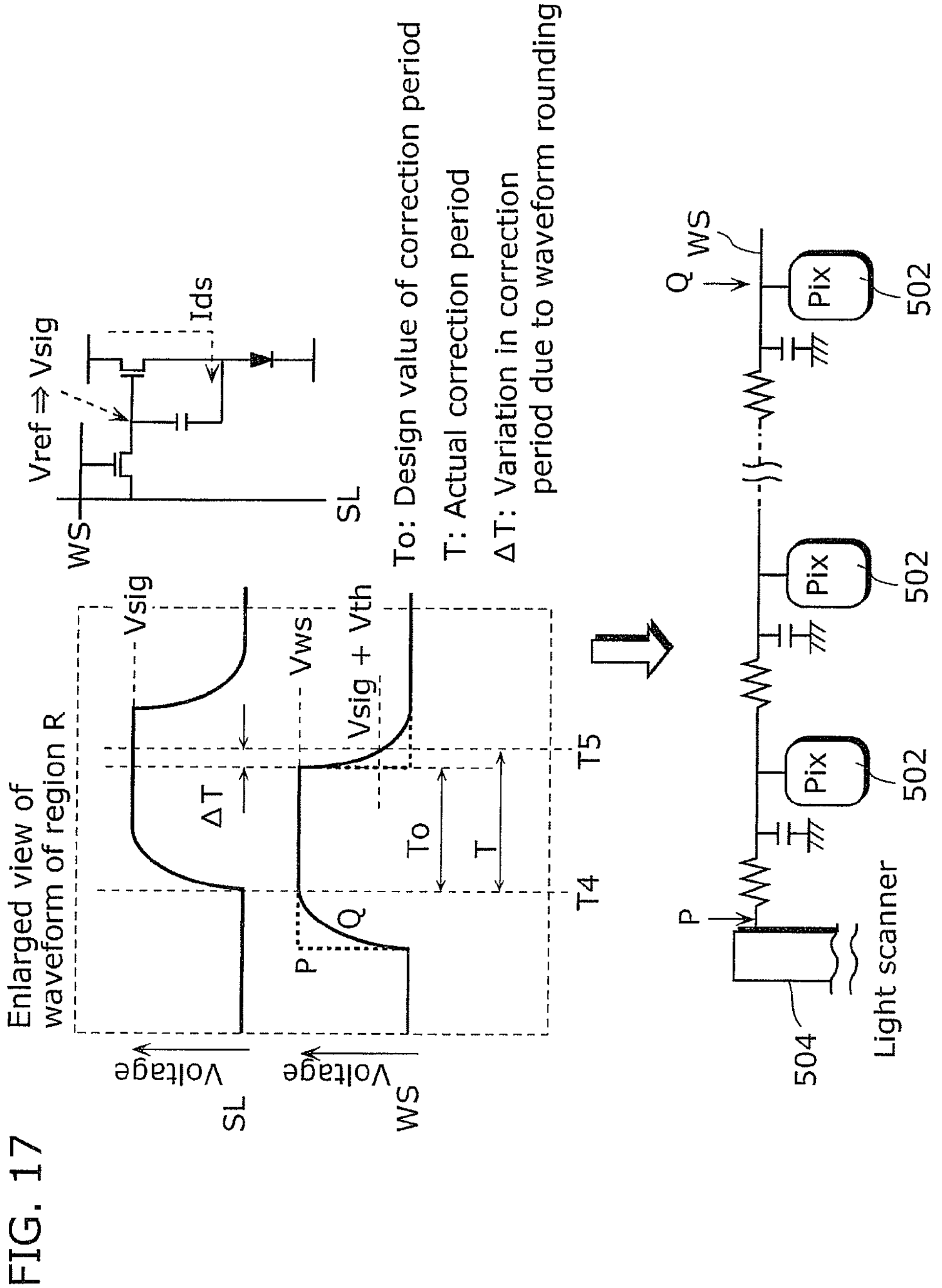
FIG. 17 is a diagram showing variation in the mobility correction period in the display device disclosed in Patent Reference 1.

As shown in FIG. 6, at the end time of the mobility correction period, due to wiring delay of the scanning line, the voltage waveform of the scanning line 21 or 22 at point P (shown in FIG. 17) which is closer to the scanning line driving circuit 4 is a square wave (dashed line in FIG. 6) which reflects the driving voltage of the scanning line driving circuit 4. On the other hand, the voltage waveform of the scanning line 21 or 22 at point Q (shown in FIG. 17) which is farther from the scanning line driving circuit 4 includes waveform rounding (solid line in FIG. 6) which depends on time constant at the time of rising and falling. In such a state, the end time of the mobility correction of the conventional method is, for example, in the pixel circuit shown in FIG. 2, the time when the voltage between the gate and the source of the selecting transistor 12 reaches the threshold voltage Vth21 of the selecting transistor 12. More specifically, it is the time when the scanning voltage V21 applied to the gate electrode of the selecting transistor 12 falls to the potential that is the sum of the V1 which is the source potential of the selecting transistor 12 and the threshold voltage Vth21. Therefore, the end time of the mobility correction is different at point P and point Q. While the maximum value of the mobility correction period is TO shown in FIG. 6 at point P, it is T0+ΔT1 shown in FIG. 6 at point Q. Further, at point Q, the variation in the mobility correction period caused from the change in the shade of gray is ΔT1. This corresponds to 1V to 7V which is the variation range of the signal voltage Vdata shown in FIG. 5. On the other hand, at point P, the variation in the mobility correction period caused from the change in the shade of gray is almost 0. The variation ΔT1 in the mobility correction period at point Q differs depending on the distance from the scanning line driving circuit 4, that is, the amount of delay of the scanning line. Thus, the variation in the mobility correction period caused from the change in the shade of gray is different for each luminescence pixel.

In the display panel device and the control method thereof according to Embodiment 1 of the present invention, the end time of the mobility correction is set to be the time when the switching transistor 16 is switched from its ON state to its OFF state, but not the time when the selecting transistor 12 is switched from its ON state to its OFF state. More specifically, the end time of the mobility correction is, for example, when the scanning voltage V22 applied to the gate electrode of the switching transistor 16 falls to the potential that is the sum of the V2 that is the source potential of the switching transistor 16 and the threshold voltage Vth22 of the switching transistor 16. Therefore, the end time of the mobility correction at point Q is T0+ΔT2 shown in FIG. 6. Further, at point Q, the variation in the mobility correction period caused from the change in the shade of gray is ΔT2. This corresponds to 0.7 V to 4.3 V that is the variation range of the potential V2 shown in FIG. 5.

According to the graph shown in FIG. 5, the variation range of V1 is 6V, and the variation range of V2 is 3.5V; and thus, the relationship is the variation range of V1>the variation range of V2. Based on this and FIG. 6, ΔT1>ΔT2 is derived. To be more specific, the variation ΔT2 in the mobility correction period at point Q in the present invention also depends on the distance from the scanning line driving circuit 4, that is the amount of delay of the scanning line. However, compared to the variation ΔT1 in the mobility correction period at point Q in the conventional method, the variation in the mobility correction period caused from the change in the shade of gray for each luminescence pixel in the present invention is significantly suppressed.

With the display panel device, the display device, and the control method thereof according to an implementation of the present invention, the influence due to the wiring delay can be lowered by reducing the variation in the mobility correction period with respect to a shade of gray to be displayed. Accordingly, the variation in the mobility correction can be suppressed in all shades of gray.

Next, descriptions are given of the advantageous effects of the display panel device, the display device, and the control method thereof in Embodiment 1 of the present invention. The effects are produced through calculation of the mobility correction period from the transient characteristics of the scanning signal.

Figure 7:
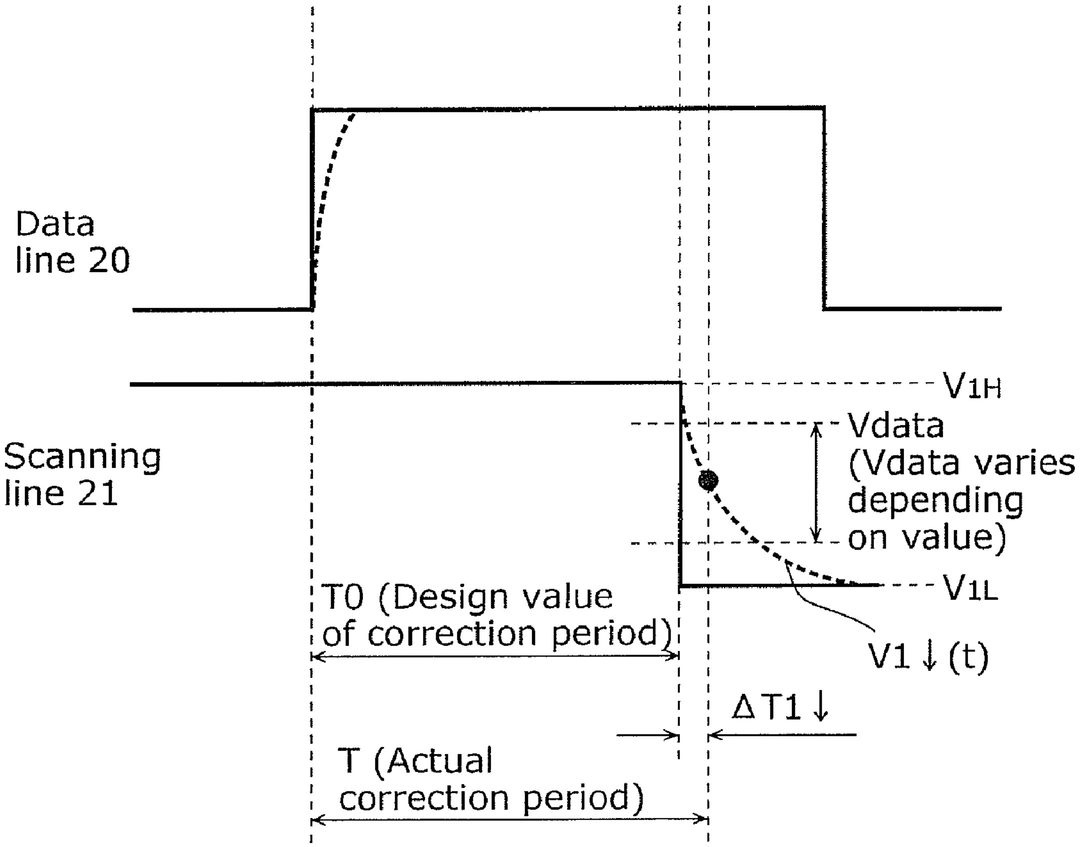
FIG. 7 is a diagram showing calculation parameter for the mobility correction period in the conventional display device.
Figure 14:
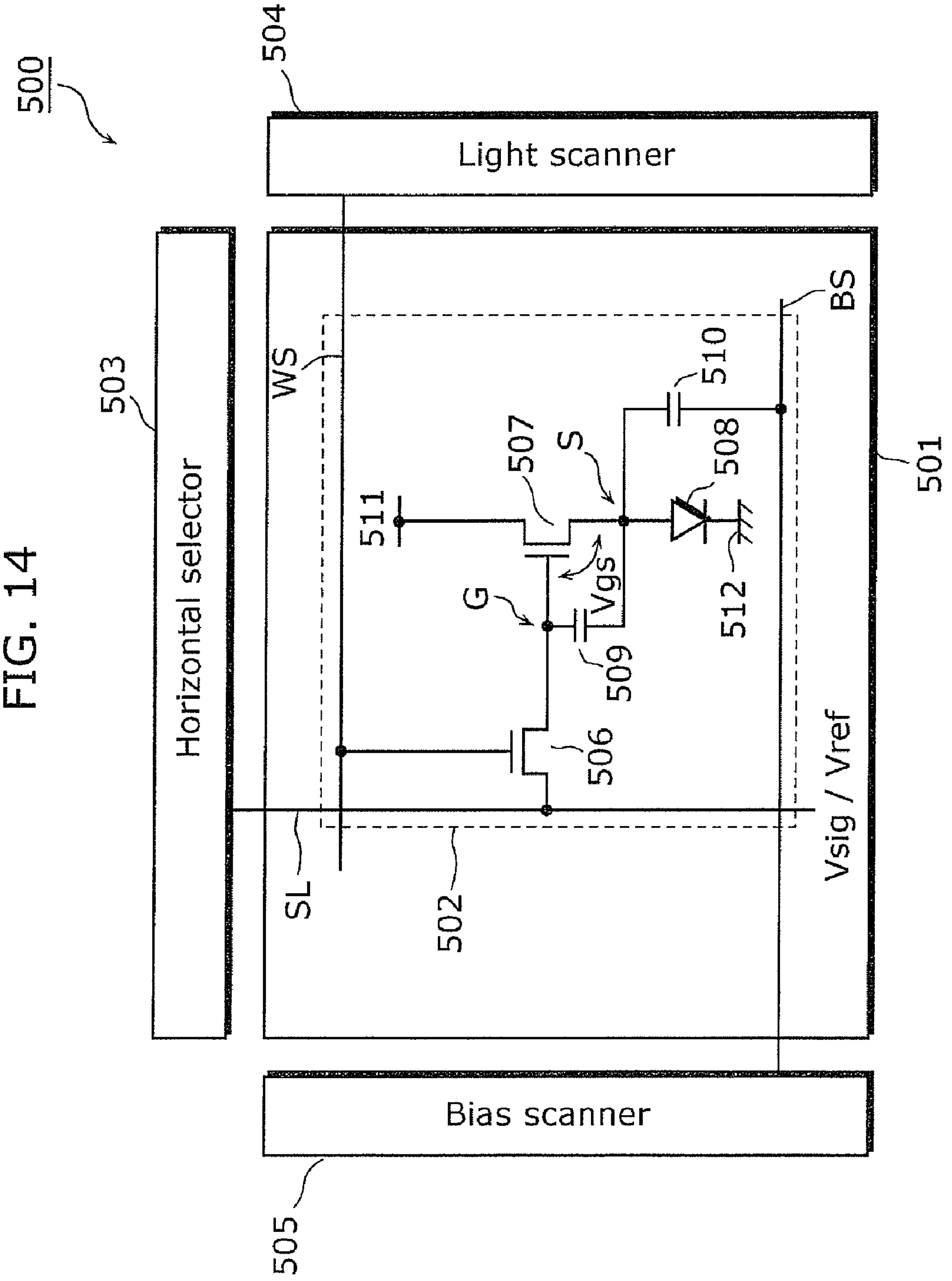
FIG. 14 is a diagram showing a circuit configuration of a pixel unit in a conventional display device disclosed in Patent Reference 1.
Figure 15:
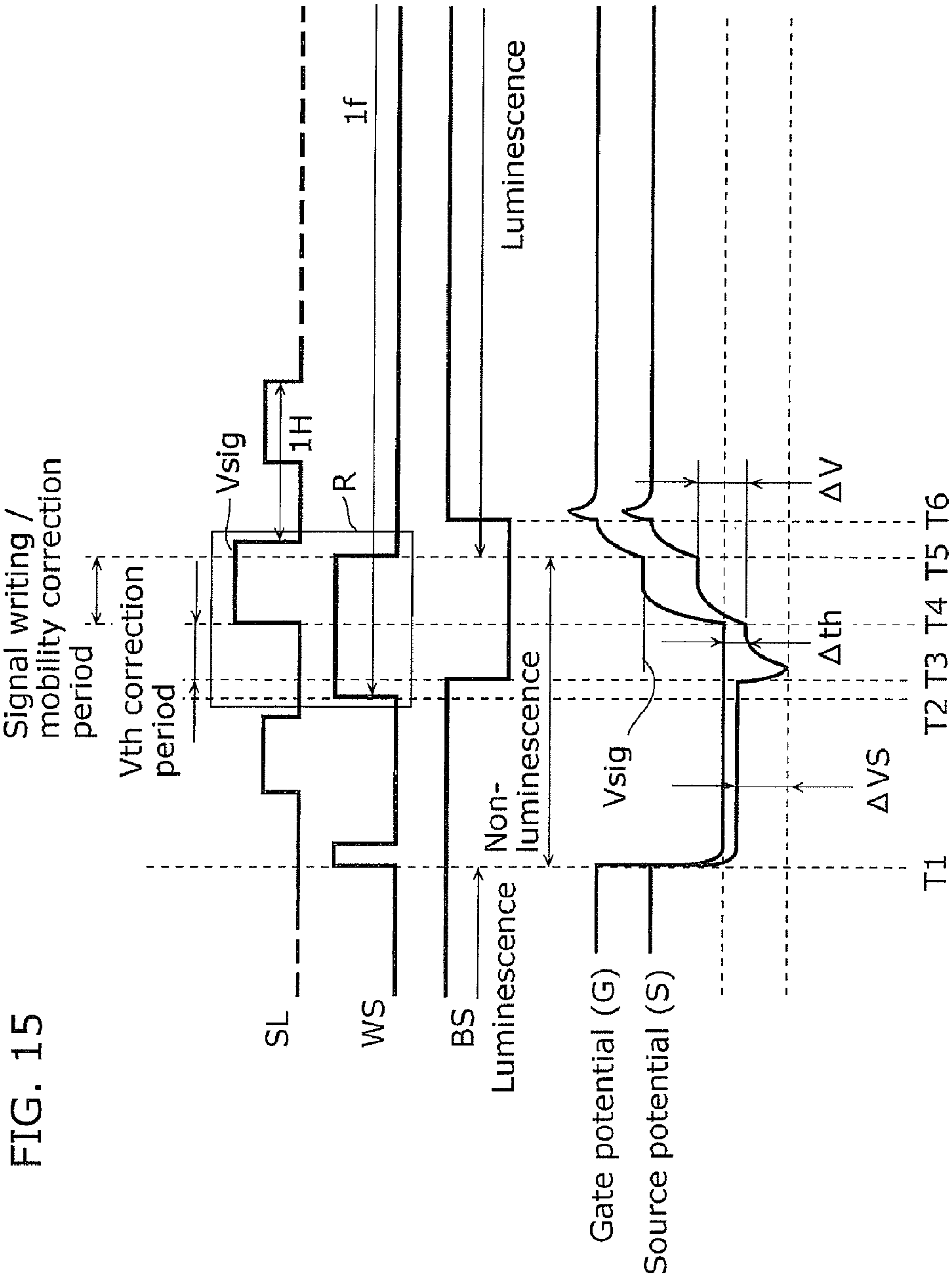
FIG. 15 is a chart showing operation timing of the conventional display device disclosed in Patent Reference 1.
Figure 16:
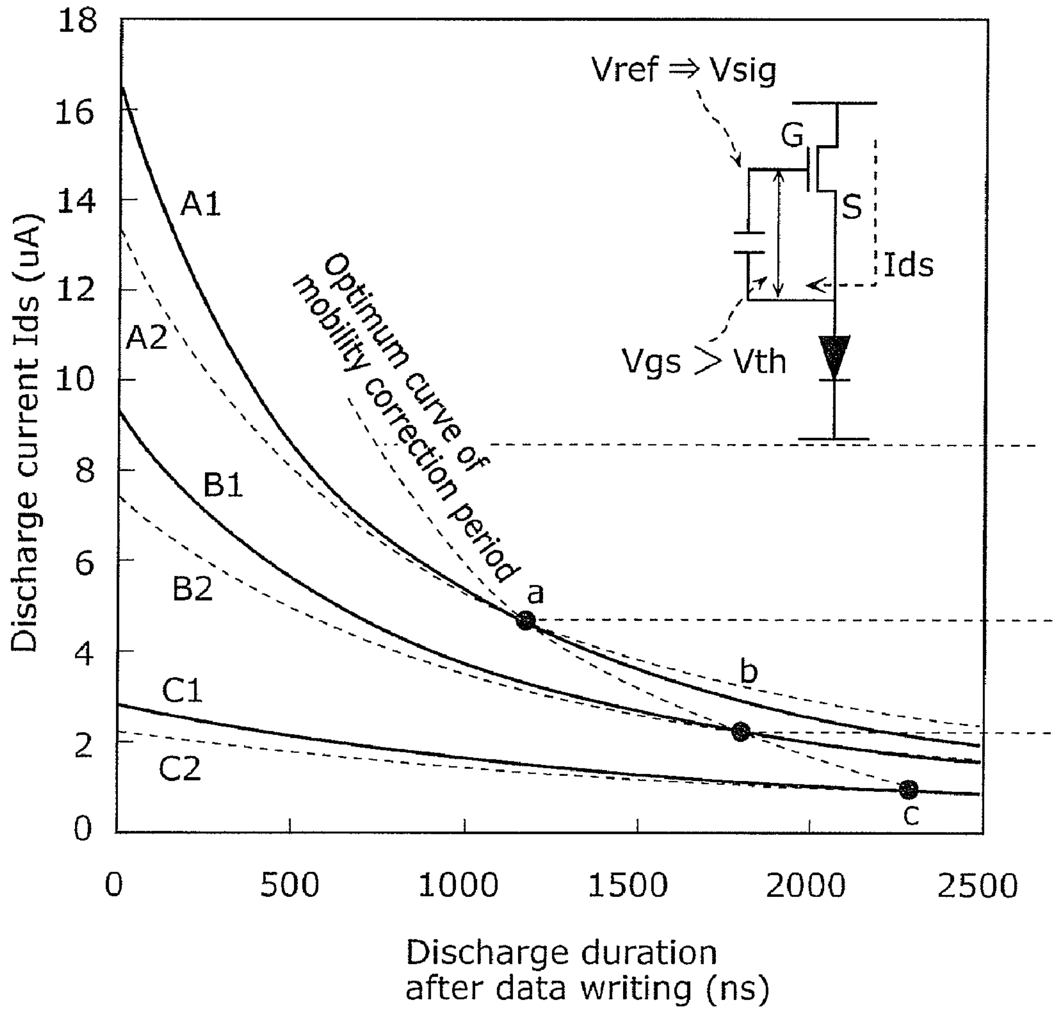
FIG. 16 is a graph showing characteristics of discharge current of a capacitor in a mobility correction period.

FIG. 7 is a diagram showing calculation parameter for the mobility correction period in the conventional method. As in the timing chart shown in FIG. 15, the scanning line WS which corresponds to the scanning line 21 is turned ON at time T2 in advance. Following this, the time when the signal voltage Vdata is applied from the data line 20 to the gate electrode of the driving transistor 11 at time T4 is the start time of the mobility correction period. Further, as described above, the end time of the mobility correction in the conventional method is the time when the selecting transistor 12 (corresponding to the sampling transistor 506 in FIG. 14) is switched from its ON state to its OFF state by the potential difference between the source electrode of the selecting transistor 12 and scanning signal V1↓t) decreasing to the threshold voltage Vth21 of the selecting transistor 12. Therefore, the end time of the mobility correction period delays by ΔT1↓ due to the time constant of the selecting transistor 12 with respect to the design value of the end time of the mobility correction period. Accordingly, the mobility correction period T in the conventional display device can be expressed by the following equation.

[Equation 1]

$$T=T_0+\Delta T_{1\downarrow} \quad \text{(Equation 1)}$$

Further, the transient characteristics V1↓(t) of the voltage at the gate electrode of the selecting transistor 12 when the selecting transistor 12 is switched to its OFF state, that is, when the scanning signal of the scanning line 21 is changed from the high level of V1H to the low level of V1L, can be expressed by the following equation.

[Equation 2]

$$V_1\downarrow(t)=(V_{1L}-V_{1H})\cdot\left(1-\exp\left(-\frac{t}{\tau_1}\right)\right)+V_{1H} \quad \text{(Equation 2)}$$

In the above equation 2, let the time at which the scanning line driving circuit 4 applies the scanning signal V1L to the scanning line 21 be t=0. Here, the time when selecting transistor 12 is switched from its ON state to OFF state according to the scanning signal is the time when the potential difference between the voltage V1↓(t) at the gate electrode of the selecting transistor 12 and Vdata that is the potential of the source electrode of the selecting transistor 12 becomes the threshold voltage Vth21 of the selecting transistor 12.

[Equation 3]

$$Vgs = (V_{1L} - V_{1H})\cdot\left(1 - \exp\left(-\frac{\Delta T_{1\downarrow}}{\tau_1}\right)\right) + V_{1H} - V_{data} = Vth_{21} \quad \text{(Equation 3)}$$

The state can be expressed by the above equation.

Figure 9B:
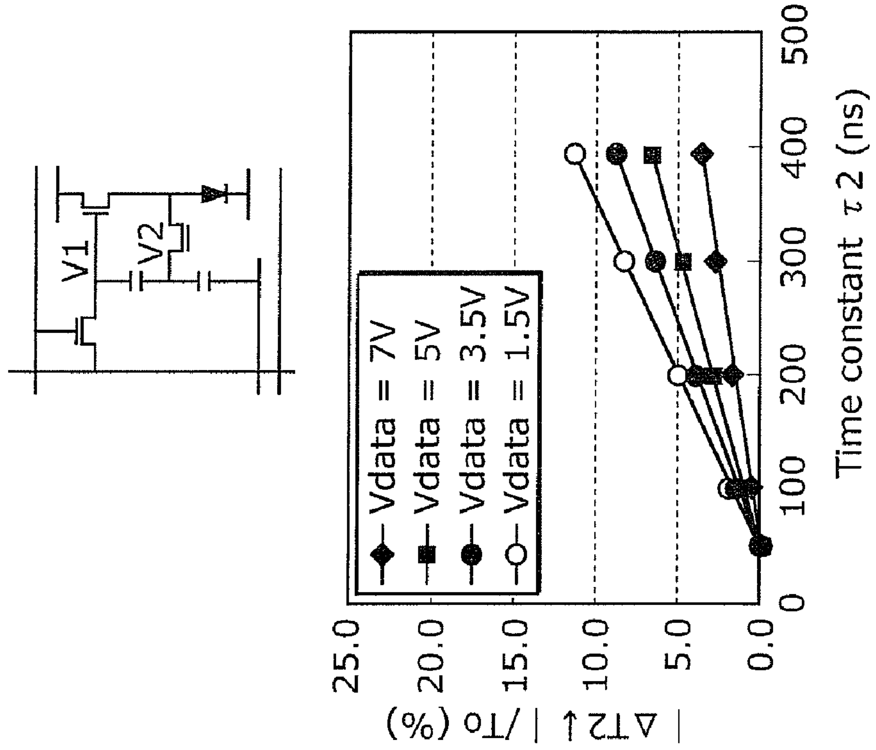
FIG. 9B is a graph showing time constant dependence of the mobility correction period calculated by a determination method of the mobility correction period of the display panel device according to the present invention.
Figure 9A:
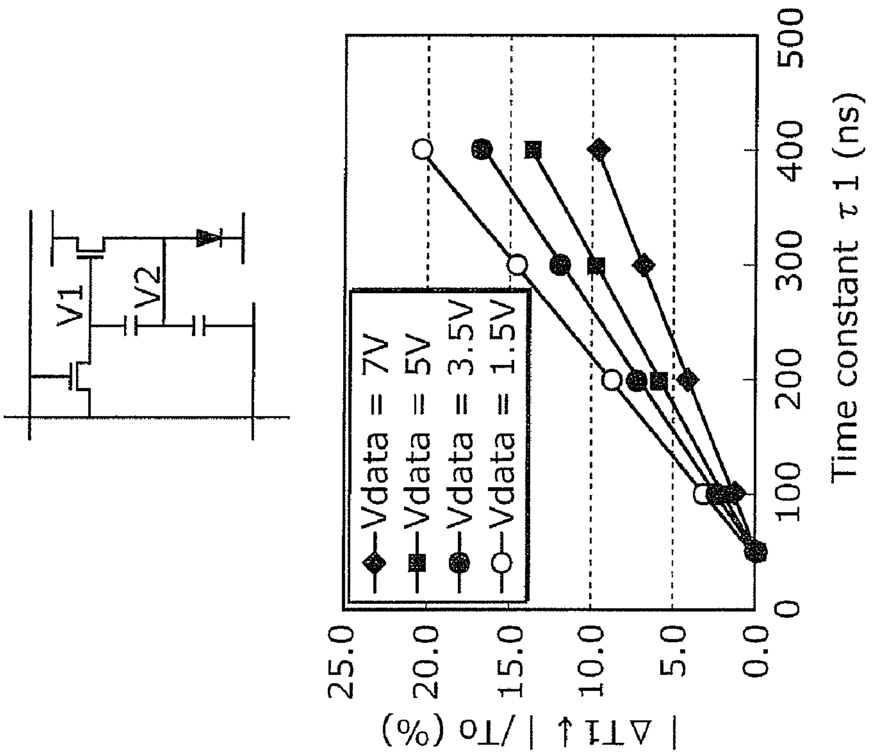
FIG. 9A is a graph showing time constant dependence of the mobility correction period calculated by a conventional determination method of the mobility correction period.

FIG. 9A is a graph showing time constant dependence of the mobility correction period calculated by a conventional determination method of the mobility correction period. The horizontal axis represents time constant τ1 for turning ON and OFF the selecting transistor 12, and the vertical axis represents the ratio of the delay time ΔT1↓ of the mobility correction period to the design value T0 of the mobility correction period. More specifically, the horizontal axis indicates that the greater the time constant τ1 is, the farther the pixel circuit is located from the scanning line driving circuit. The graph shown in FIG. 9A indicates the relationship between time constant τ1 and ΔT1↓/T0 calculated from the equation 3 where Vdata are 1.5V, 3.5V, 5V, and 7V. As shown in FIG. 9A, ΔT1↓/T0 monotonically increases according to the increase of time constant τ1. More specifically, the greater the distance from the scanning line driving circuit is, the farther the mobility correction period is from the design value. Further, it is shown that the greater the Vdata is, the farther the mobility correction period is from the design value.

Figure 8:
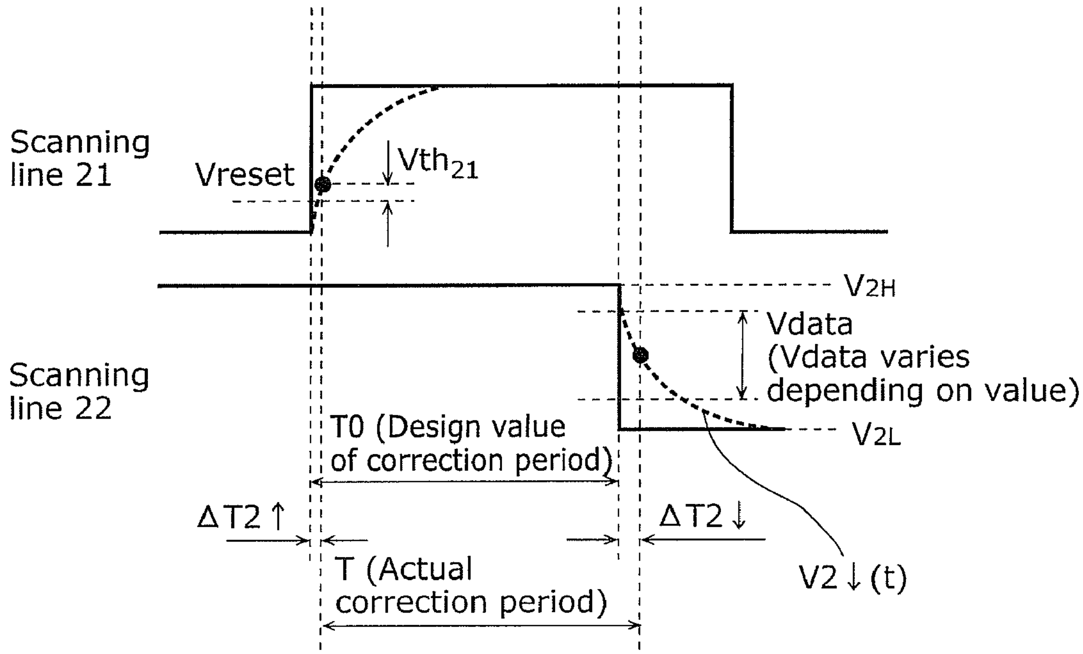
FIG. 8 is a diagram showing calculation parameter for the mobility correction period in the display panel device according to the present invention.

FIG. 8 is a diagram showing calculation parameter for the mobility correction period in the display panel device according to the present invention. In the present embodiment, as shown in the timing chart in FIG. 3, the start time of the mobility correction period is the time when the signal voltage Vdata is applied from the data 20 to the gate electrode of the driving transistor 11 via the selecting transistor 12 and the potential of the gate electrode exceeds the sum of the threshold voltage Vth21 of the selecting transistor 12 and the fixed voltage Vreset at time t08 when the selecting transistor 12 is turned ON. Thus, the start time of the mobility correction period is the time when the difference between the Vreset that is the potential of V1 before time t08 and the scanning signal is greater than Vth21. Further, the end time of the mobility correction period in the present invention is the time when the switching transistor 16 whose potential of the source electrode will become V2 is switched from its ON state to its OFF state. Therefore, the end time of the mobility correction period in the present invention delays by ΔT2↓ due to the time constant of the selecting transistor 16 with respect to the design value of the end time of the mobility correction. Accordingly, where the design value of the mobility correction period is TO, and the period from when the signal voltage Vdata is applied to the gate electrode of the driving transistor 11 until the potential of the gate electrode becomes the threshold voltage Vth21 of the selecting transistor is ΔT2↑, the mobility correction period T of the display panel device in the present invention can be expressed as follows.

[Equation 4]

$$T = T_0 + \Delta T_{2\downarrow} - \Delta T_{2\uparrow} \cong T_0 + \Delta T_{2\downarrow} \quad \text{(Equation 4)}$$

Here, ΔT2↑ is determined by the relationship between the fixed voltage Vreset and the threshold voltage Vth21 of the selecting transistor 12; and thus, ΔT2↑ is independent of change of the signal voltage Vdata, and is sufficiently smaller than ΔT2↓. Accordingly, the mobility correction period T is expressed as in right-hand side in the equation, and varies only depending on the end time of the mobility correction. Further, the potential V2 of the source electrode of the switching transistor 16 is equal to the anode voltage of the organic EL element 13 when the switching transistor 16 is in its ON state; and thus, where V2 is Vanode (t), Vanode(t) can be expressed by the following equation.

[Equation 5]

$$V_{anode}(t) = V_{data} - V_{th} - \frac{1}{\dfrac{\beta\cdot t}{2(C_1 + C_2 + C_{el})} + \dfrac{C_1 + C_2 + C_{el}}{(C_2 + C_{el})(V_{data} - V_{reset})}} \quad \text{(Equation 5)}$$

Here, Vth is the threshold voltage of the driving transistor 11; β is a parameter representing the mobility of the driving transistor 11; C1, C2, and Cel are capacitances of the capacitor 14, the capacitor 15 and the organic EL element 13, respectively; and Vreset is the fixed voltage supplied from the data line 20.

Further, when the switching transistor 16 is switched to an OFF state, that is, when the scanning signal of the scanning line 22 is changed from the high level of V2H to the low level of V2L, the transient characteristics V2↓(t) of the voltage of the gate electrode of the switching transistor 16 can be expressed by the following equation.

[Equation 6]

$$V_{2\downarrow}(t) = (V_{2L} - V_{2H})\cdot\left(1 - \exp\left(-\frac{t}{\tau_2}\right)\right) + V_{2H} \quad \text{(Equation 6)}$$

In the above equation 6, let the time at which the scanning line driving circuit 4 applies the scanning signal V2L to the scanning line 22 is t=0. Here, the switching transistor 16 is switched from its ON state to its OFF state by the scanning signal V2L when the potential difference between the voltage V2↓(t) of the gate electrode of the switching transistor 16 and the Vdata that is the potential of the source electrode of the switching transistor 16 becomes the threshold voltage Vth22 of the switching transistor 16 in the equation 6.

[Equation 7]

$$V_{gs} = (V_{2L} - V_{2H})\cdot\left(1 - \exp\left(-\frac{\Delta T_{2\downarrow}}{\tau_2}\right)\right) + V_{2H} - \left(V_{data} - V_{th} - \frac{1}{\dfrac{\beta\cdot(\Delta T_{2\downarrow} + T_0)}{2(C_1 + C_2 + C_{el})} + \dfrac{C_1 + C_2 + C_{el}}{(C_2 + C_{el})(V_{data} - V_{reset})}}\right) = Vth_{22} \quad \text{(Equation 7)}$$

This state can be expressed by the above equation.

FIG. 9B is a graph showing time constant dependence of the mobility correction period calculated by a determination method of the mobility correction period in the display panel device according to the present invention. The horizontal axis represents time constant τ2 for turning ON and OFF the switching transistor 16, and the vertical axis represents the ratio of the delay time ΔT2↓ of the mobility correction period to the design value TO of the mobility correction period. More specifically, the horizontal axis indicates that the greater the time constant τ2 is, the farther the pixel circuit is located from the scanning line driving circuit. The graph shown in FIG. 9B shows the relationship between the time constant τ2 and Δ2↓/T0 calculated from the above equation 7 where Vdata are 1.5V, 3.5V, 5V, and 7V. As shown in FIG. 9B, ΔT2↓/T0 monotonically increases according to the increase of time constant τ2. More specifically, the greater the distance from the scanning line driving circuit is, the farther the mobility correction period is from the design value. Further, it can also be shown that the greater the Vdata is, the farther the mobility correction period is from the design value.

However, when the characteristics of the conventional mobility correction period shown in FIG. 9A is compared with the characteristics of the mobility correction period of the display panel device in the present invention shown in FIG. 9B, it can be seen that ΔT2↓/T0 in the case of the display panel device in the present invention shown in FIG. 9B is smaller for each time constant τ2. On the other hand, variation range of ΔT2↓/T0 is smaller with respect to the variation range of the signal voltage Vdata.

Based on the evaluation result above, by performing control of the end of the mobility correction of the driving transistor 11 using discharge current by the switching transistor 16, it is possible to set the voltage variation range of the source electrode for determining timing of the switching to be smaller than performing control by the selecting transistor 12. This allows suppression of the variation in mobility correction period caused due to wiring delay. Accordingly, it is possible to suppress the variation in the mobility correction with respect to all writing voltage.

Further, by starting the mobility correction of the driving transistor 11 using the discharge current at the same time of writing of the signal voltage Vdata to the capacitor 14, it is possible to reduce writing processing period of the signal voltage Vdata to the capacitor 14 and processing period of mobility correction of the driving transistor 11 using the discharge current. This is particularly useful for a display panel device with an increased pixel count for a larger screen which does not allow enough writing period and the mobility correction period for each pixel.

Further, according to the present embodiment, in the correction period of the threshold voltage of the driving transistor 11, reverse bias voltage is written to the capacitor 15 while the fixed voltage for fixing the voltage of the first capacitor electrode of the capacitor 14 is being supplied from the data line 20 by controlling the selecting transistor 12. The reverse bias voltage and the fixed voltage generate, in the capacitor 14, potential difference greater than the threshold voltage of the driving transistor 11. Then, there is an interval of time period longer than the time period taken for the potential difference between the first capacitor electrode and the second capacitor electrode of the capacitor 14 to reach the threshold voltage of the driving transistor 11. Accordingly, the charge corresponding to the threshold voltage of the driving transistor 11 is accumulated in the capacitor 14. In addition, during the time period during this period before the threshold voltage is reached, the source electrode of the driving transistor 11 is reversely biased by the capacitor 15; and thus, the drain current of the driving transistor 11 does not flow through the organic EL element 13. Then, when the potential difference between the both end electrodes of the capacitor 14 becomes the threshold voltage of the driving transistor 11, the drain current stops flowing. In this state, the signal voltage starts to be supplied to the first capacitor electrode of the capacitor 14. As a result, the charge corresponding to the threshold voltage of the driving transistor 11 is accumulated in the capacitor 14.

As described, after the threshold voltage of the driving transistor 11 is held by the capacitor 14, the signal voltage is supplied to the first capacitor electrode of the capacitor 14; and thus, it is possible to accumulate, in the capacitor 14, desired potential difference in which the video signal is reflected and the threshold voltage of the driving transistor 11 is corrected.

Following this, according to the present embodiment, in the mobility correction period of the driving transistor 11, mobility correction of the driving transistor 11 is performed using the discharge current flowing from the driving transistor 11 to the second capacitor electrode of the capacitor, during the period from when the signal voltage is supplied to the first capacitor electrode of the capacitor 14 by controlling the selecting transistor 12 to cause the discharge current to flow between the source electrode of the driving transistor 11 and the second capacitor electrode of the capacitor 14 until non-conduction is caused between the source electrode of the driving transistor 11 and the second capacitor electrode of the capacitor 14 by controlling the switching transistor 16.

According to the present embodiment, the values of the fixed voltage and the reverse bias voltage are set in advance such that the anode electrode of the organic EL element 13 has the voltage lower than the threshold voltage of the organic EL element 13 in the above period. Therefore, even if conduction is caused between the source electrode of the driving transistor 11 and the second capacitor electrode of the capacitor 14, it is possible to prevent the organic EL element 13 from producing luminescence before the end of the mobility correction of the driving transistor. As a result, the variations in luminescence among the pixels can be precisely corrected.

(Embodiment 2)

A display panel device in the present embodiment is different from the display panel device in Embodiment 1 in the pixel circuit configuration and in the driving timing thereof. In addition, the display panel device in the present embodiment does not include the bias line driving circuit 3. The pixel circuit configuration of the pixel circuit 30 in the present embodiment differs from that of the pixel circuit 10 in Embodiment 1 in that the capacitor 15 and the bias line 23 are not included, but instead, a switching transistor 17 and a scanning line 26 are added. Hereinafter, descriptions of similarities to the circuit configuration according to Embodiment 1 are omitted, and only differences from the circuit configuration in Embodiment 1 are described.

Figure 10:
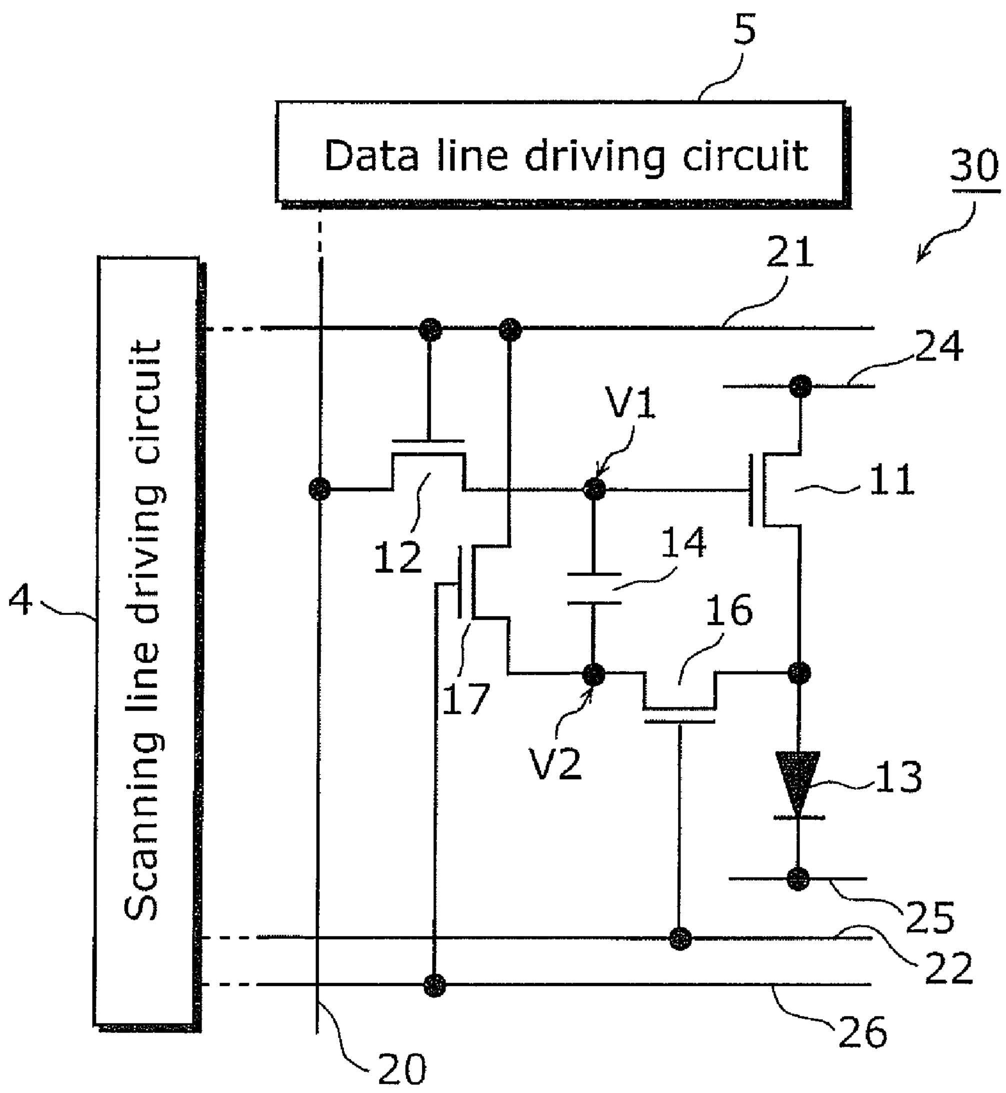
FIG. 10 is a diagram showing a circuit configuration of a luminescence pixel included in a display unit and connections with the surrounding circuits according to Embodiment 2 of the present invention.

FIG. 10 is a diagram showing a circuit configuration of a luminescence pixel included in a display unit and connections with the surrounding circuits according to Embodiment 2 of the present invention. The luminescence pixel 30 in FIG. 10 includes: the driving transistor 11, the selecting transistor 12, the organic EL element 13, the capacitor 14, the switching transistors 16 and 17, the data line 20, the scanning lines 21, 22, and 26, the positive power line 24, and the negative power line 25. Further, the surrounding circuits include the scanning line driving circuit 4, and the data line driving circuit 5.

The following descriptions are given of connection relationships and functions of the structural elements shown in FIG. 10.

The scanning line driving circuit 4 is connected to the scanning lines 21, 22, and 26, and functions to switch conduction and non-conduction of the selecting transistor 12 and the switching transistors 16 and 17 included in the luminescence pixel 11 by providing scanning signals to the scanning lines 21, 22, and 26, respectively.

The switching transistor 17 is a third switch connected between the second capacitor electrode of the capacitor 14 and the scanning line 21. The switching transistor 17 functions to determine timing at which the reference voltage that is the scanning signal voltage of low level of the scanning line 21 is applied to the second capacitor electrode of the capacitor 14. Further, the switching transistor 17 also functions to determine the source potential of the driving transistor 11 in a state where the switching transistor 16 is conductive, by the reference voltage being applied to the second capacitor electrode of the capacitor 14. With such functions, it is possible to generate, in the capacitor 14, potential difference greater than the threshold voltage of the driving transistor 11 through application of the reference voltage from the scanning line 21 via the switching transistor 17, even if the voltage applied from the data line 20 is a fixed voltage that is not a signal voltage.

Further, the fixed voltage is set in advance such that the voltage between the anode and the cathode of the organic EL element 13 is lower than the threshold voltage of the organic EL element 13, in the detection period of threshold voltage from when the fixed voltage is supplied to the first capacitor electrode of the capacitor 14 until predetermined time period is elapsed after the reference voltage is supplied to the second capacitor electrode of the capacitor 14, and in the mobility correction period from when the signal voltage is supplied to the first capacitor electrode of the capacitor 14 until predetermined time period is elapsed. Thus, during the above periods, the drain current of the driving transistor 11 does not flow through the organic EL element 13. Accordingly, periods for correcting threshold voltage and mobility of the driving transistor 11 can be included before the luminescence period during which the organic EL element 13 produces luminescence.

The scanning line 21 is connected to the scanning line driving circuit 4, and to each of the luminescence pixels belonging to the pixel row including the luminescence pixel 30. Further, the scanning line 21 is connected to the second capacitor electrode of the capacitor 14 via the switching transistor 17. Consequently, the scanning line 21 functions to apply the scanning signal voltage to the second capacitor electrode of the capacitor 14 by turning ON the switching transistor 17.

The scanning line 26 is connected to the scanning line driving circuit 4, and functions to provide timing at which reference voltage that is a scanning signal of low level of the scanning line 21 is applied to the potential of the second capacitor electrode of the capacitor 14.

Note that a display device which includes the display panel device and the above voltage source according to the present embodiment is also an implementation of embodiments of the present invention.

Figure 11:
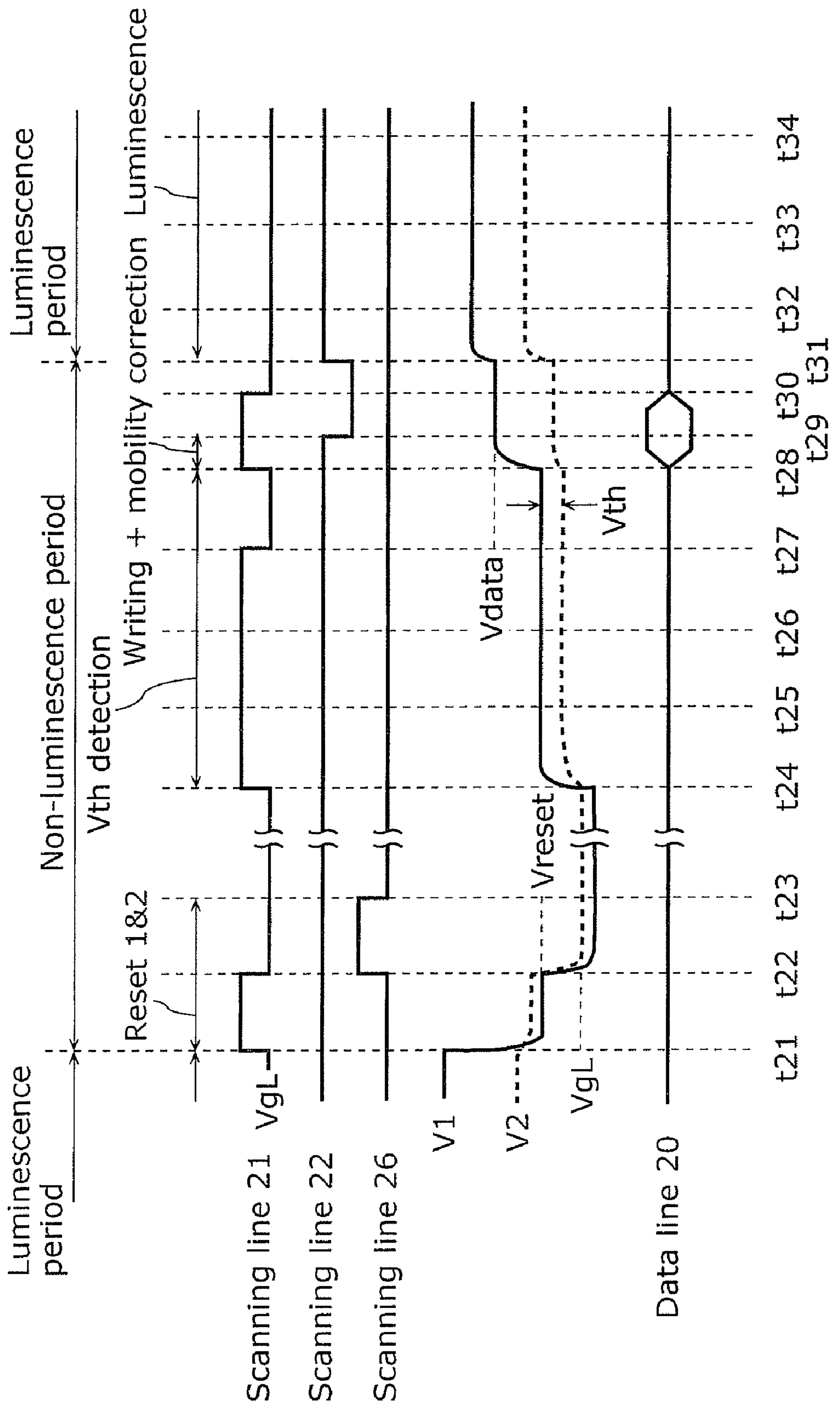
FIG. 11 is a chart showing operation timings in a control method of the display panel device according to Embodiment 2 of the present invention.
Figure 12:
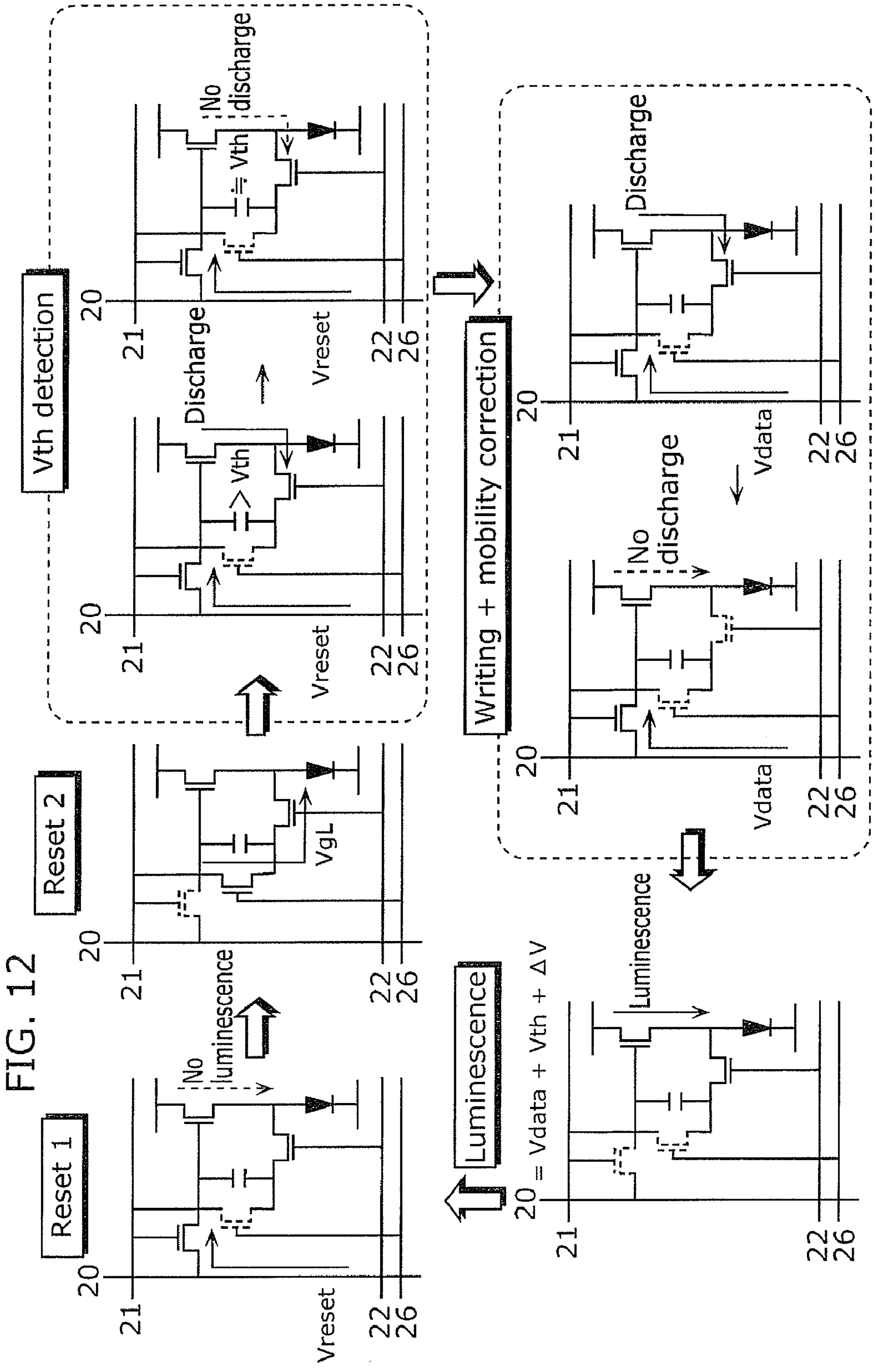
FIG. 12 is a diagram showing state transition of the pixel circuit included in the display panel device according to Embodiment 2 of the present invention.

Next, the following describes the control method of the display device according to the present embodiment with reference to FIG. 11 and FIG. 12.

FIG. 11 is a chart showing operation timings in a control method of the display device according to Embodiment 2 of the present invention. In FIG. 11, the horizontal axis represents time. Furthermore, in the vertical direction, waveforms of voltages generated in the scanning line 21, the scanning line 22, the scanning line 26, the potential V1 of the first capacitor electrode of the capacitor 14, the potential V2 of the second capacitor electrode of the capacitor 14, and the data line 20 are shown from top to bottom in this order. FIG. 11 shows operations of the display device for a single pixel row. A single frame period includes a non-luminescence period and a luminescence period. Further, correction operations on the threshold voltage Vth and the mobility β of the driving transistor 11 are performed in the non-luminescence period.

Further, FIG. 12 is a state transition diagram for a pixel circuit included in the display device according to Embodiment 2 of the present invention.

First, at time t21, the scanning line driving circuit 4 changes the voltage level of the scanning line 21 from low to high so that the selecting transistor 12 is turned ON. As a result, fixed voltage Vreset is applied to the gate electrode of the driving transistor 11 via the data line 20. Here, the switching transistor 16 is in its ON state, and the switching transistor 17 is in its OFF state. Accordingly, the luminescence period of a preceding frame ends. The period from time t21 to time t22 is a state where luminescence is not being produced, and corresponds to the state of reset 1 in FIG. 12.

Next, at time t22, the scanning line driving circuit 4 changes the voltage level of the scanning line 21 from high to low so that the selecting transistor 12 is turned OFF. At the same time, the voltage level of the scanning line 26 is changed from low to high so that the reference voltage VgL that is a scanning signal of low level of the scanning line 21 is applied to the second capacitor electrode of the capacitor 14 via the switching transistor 17. The reference voltage VgL is set in advance such that the voltage between the anode and the cathode of the organic EL element 13 becomes lower than the threshold voltage of the organic EL element 13.

Next, at time t23, the scanning line driving circuit 4 changes the voltage level of the scanning line 26 from high to low so that the application of the reference voltage VgL to the second capacitor electrode of the capacitor 14 is stopped. During the period from time t22 to time t23, the reference voltage VgL is being applied to the second capacitor electrode of the capacitor 14 and the source electrode of the driving transistor 11, and it corresponds to the state of the reset 2 in FIG. 12.

Next, at time t24, the scanning line driving circuit 4 changes the voltage level of the scanning line 21 from low to high so that the fixed voltage Vreset is applied from the data line 20 to the first capacitor electrode of the capacitor 14. At this time, the fixed voltage Vreset applied to the first capacitor electrode of the capacitor 14 and the reference voltage VgL that had already been applied to the second capacitor electrode of the capacitor 14 at time t22 generate, in the capacitor 14, potential difference greater than the threshold voltage Vth of the driving transistor 11. As a result, the driving transistor 11 is turned ON, causing the drain current of the driving transistor 11 to flow on a current path of the positive power line 24, the driving transistor 11, the switching transistor 16, and the second capacitor electrode of the capacitor 14. The drain current flows during the period from time t24 to time t27, and the drain current stops flowing when the voltage held by the capacitor 14 becomes Vth. Accordingly, the charge corresponding to the threshold Vth is accumulated in the capacitor 14. Further, at the end of this period, the source electrode of the driving transistor 11 becomes (Vreset-Vth) due to the drain current, but the drain current does not flow through the organic EL element 13 since the fixed voltage Vreset is set in advance to be lower than the threshold voltage of the organic EL element 13.

Next, at time t27, the scanning line driving circuit 4 changes the voltage level of the scanning line 21 from high to low so that the selecting transistor 12 is turned OFF. This stops the supply of the fixed voltage Vreset to the first capacitor electrode of the capacitor 14. Here, the voltage between the gate and the source of the driving transistor 11 is maintained to be the threshold voltage Vth, and the driving transistor 11 is in an OFF state. In this state, at time t28, the selecting transistor 12 is turned ON so that the signal voltage Vdata starts to be supplied to the first capacitor electrode of the capacitor 14. In the period from time t27 to time t28, the period between the detection period of the threshold voltage of the driving transistor 11 and the mobility correction period can be adjusted by controlling the selecting transistor 12. Further, the period from time t24 to time t28 corresponds to the state of the Vth detection in FIG. 12.

Next, at time t28, the scanning line driving circuit 4 changes the voltage level of the scanning line 21 from low to high so that the selecting transistor 12 is turned ON. Further, the data line driving circuit 5 supplies, via the data line 20, the signal voltage Vdata to the pixel row to which the luminescence pixel 30 is belonging. As a result, the signal voltage Vdata is applied to the gate electrode of the driving transistor 11 via the data line 20. Here, the switching transistor 16 is in an ON state. Accordingly, the signal voltage Vdata is supplied to the first capacitor electrode of the capacitor 14 while conduction is caused between the source electrode of the driving transistor 11 and the second capacitor electrode of the capacitor 14. This allows current to flow between the source electrode of the driving transistor 11 and the second capacitor electrode of the capacitor 14. With this, at the same time of writing of the signal voltage to the capacitor 14, mobility correction of the driving transistor 11 starts using the discharge current path of the positive power line 24, the driving transistor 11, the switching transistor 16, and the second capacitor electrode of the capacitor 14

Next, at time t29, the scanning line driving circuit 4 changes the voltage level of the scanning line 22 from high to low so that the switching transistor 16 is turned OFF. More specifically, non-conduction is caused between the source electrode of the driving transistor 11 and the second capacitor electrode of the capacitor 14. This ends the mobility correction of the driving transistor 11 using the discharge current. The period from time t28 to time t29 corresponds to the state of writing+mobility correction shown in FIG. 12.

During the period from time t28 to time t29, the start of mobility correction of the driving transistor 11 using the discharge current is controlled by the control of supply of the signal voltage Vdata to the capacitor 14. On the other hand, the control of end of the mobility correction of the driving transistor 11 using the discharge current is performed by the control of the switching transistor 16. This is performed separately from the control of supply of the signal voltage Vdata to the capacitor 14. More specifically, the controls of start and end of the mobility correction of the driving transistor 11 using the discharge current are performed by controlling different switches. Therefore, it is possible to precisely control the mobility correction period from when the signal voltage Vdata starts to be supplied to the first capacitor electrode of the capacitor 14 until non-conduction is caused between the source electrode of the driving transistor 11 and the second capacitor electrode of the capacitor 14 by controlling the switching transistor 16. As a result, it is possible to precisely control duration during which the charge accumulated in the capacitor 14 is caused to be discharged using the current flowing between the source electrode of the driving transistor 11 and the second capacitor electrode of the capacitor 14, thereby precisely correcting the mobility of the driving transistor 11.

The reasons that the mobility correction period can be precisely controlled with the circuit configuration and the control method according to the present embodiment is the same as described in Embodiment 1 with reference to FIG. 5 and FIG. 6.

Further, in the mobility correction period from when the signal voltage Vdata is supplied to the first capacitor electrode of the capacitor 14 (time t28) until non-conduction is caused between the source electrode of the driving transistor 11 and the second capacitor electrode of the capacitor 14 (time t29), the voltage value of the fixed voltage Vreset is set in advance such that the voltage between the anode and the cathode of the organic EL element 13 is lower than the threshold voltage of the organic EL element 13. With this, simply supplying the signal voltage Vdata that is a component changed from the fixed voltage Vreset to the first capacitor electrode of the capacitor 14 in a state where conduction is caused between the source electrode of the driving transistor 11 and the second capacitor electrode of the first capacitor does not cause the voltage between the anode and the cathode of the organic EL element 13 to exceed the threshold voltage of the organic EL element 13. Therefore, even if conduction is caused between the source electrode of the driving transistor 11 and the second capacitor electrode of the capacitor 14 in the mobility correction period, the current is prevented from flowing through the organic EL element 13. This can prevent the organic EL element 13 from producing luminescence before the end of the mobility correction of the driving transistor. As a result, the variations in luminescence among the pixels caused by the organic EL elements 13 can be precisely corrected.

Further, by starting mobility correction of the driving transistor 11 using the discharge current at the same time of writing of the signal voltage Vdata to the capacitor 14, it is possible to reduce writing processing period of the signal voltage Vdata to the capacitor 14 and processing period of mobility correction of the driving transistor 11 using the discharge current. This is particularly useful for a display panel device with an increased pixel count for a larger screen which does not allow enough writing period and mobility correction period for each pixel.

Next, at time t30, the scanning line driving circuit 4 changes the voltage level of the scanning line 21 from high to low so that the selecting transistor 12 is turned OFF. This stops the supply of the signal voltage Vdata to the first capacitor electrode of the capacitor 14.

Lastly, at time t31, the scanning line driving circuit 4 changes the voltage level of the scanning line 22 from low to high so that the switching transistor 16 is turned ON. More specifically, conduction is caused between the source electrode of the driving transistor 11 and the second capacitor electrode of the capacitor 14. This causes the driving current corresponding to the voltage (V1-V2) held by the capacitor 14 to flow through the organic EL element 13, starting luminescence of the organic EL element 13. Here, the voltage (V1-V2) held by the capacitor 14 has a value of the signal voltage Vdata obtained by correcting the signal voltage Vdata using the threshold voltage Vth and the mobility β. The periods after time t31 correspond to the state of luminescence shown in FIG. 12.

The advantageous effects of the display panel device, the display device, and the control method thereof according to Embodiment 2 of the present invention that are obtained by calculating the mobility correction period from the transient characteristics of the scanning signal are the same as those described in Embodiment 1 with FIG. 9B.

According to the present embodiment, the voltage variation range of the source electrode for determining the timing of switching can be set smaller by controlling the end of the mobility correction of the driving transistor 11 using the discharge current by controlling the switching transistor 16, compared to the case where the selecting transistor 12 controlling the same. Accordingly, it is possible to suppress the variation in the mobility correction caused due to wiring delay with respect to all writing voltage.

Further, by starting mobility correction of the driving transistor 11 using the discharge current at the same time of writing of the signal voltage Vdata to the capacitor 14, it is possible to reduce writing processing period of the signal voltage Vdata to the capacitor 14 and processing period of mobility correction of the driving transistor 11 using the discharge current. This is particularly useful for a display panel device with an increased pixel count for a larger screen which does not allow enough writing period and mobility correction period for each pixel.

Further, according to the present embodiment, the reference voltage VgL is supplied to the second capacitor electrode of the capacitor 14 by controlling the switching transistor 17, and the fixed voltage for fixing the voltage of the first capacitor electrode of the capacitor 14 is supplied by controlling the selecting transistor 12. Then, there is an interval of time period taken for the potential difference between the first capacitor electrode and the second capacitor electrode of the first capacitor to reach the threshold voltage of the driving transistor 11. As a result, the threshold voltage of the driving transistor 11 is held by the second capacitor electrode of the capacitor 14. Further, during this period before the threshold voltage is reached, the source electrode of the driving transistor 11 is defined by the relationship between the fixed voltage Vreset and the reference voltage VgL; and thus, the drain current of the driving transistor 11 does not flow through the organic EL element 13. Then, when the potential difference between the both end electrodes of the capacitor 14 becomes the threshold voltage of the driving transistor 11, the drain current stops flowing. In this state, the signal voltage starts to be supplied to the first capacitor electrode of the capacitor 14. As a result, the charge corresponding to the threshold voltage of the driving transistor 11 is accumulated in the capacitor 14.

Further, the reference voltage VgL applied to the second capacitor electrode of the capacitor 14 as a previous step for detecting the threshold voltage of the driving transistor 11 is set to be low voltage of the scanning line 21 for controlling the selecting transistor 12. Here, the reference voltage VgL and the fixed voltage Vreset generate, in the capacitor 14, the potential difference greater than the threshold voltage of the driving transistor 11. Further, the fixed voltage Vreset is set in advance such that the voltage of the first luminescence electrode of the organic EL element 13 becomes lower than the threshold voltage of the organic EL element 13 in the mobility correction period. Therefore, even if conduction is caused between the source electrode of the driving transistor 11 and the second capacitor electrode of the capacitor 14 in the mobility correction period, it is possible to prevent the organic EL element 13 from producing luminescence before the end of the mobility correction of the driving transistor 11. This causes the drain current corresponding to the desired potential difference to flow through the organic EL element, thereby precisely controlling the luminescence amount of the organic EL element. In addition, simplification of the pixel circuit is also possible.

Embodiments 1 and 2 have been described above. It is to be noted that the display panel device, the display device, and the control method thereof according to the present invention is not limited to the above-mentioned embodiments. The present invention should be appreciated as including: other embodiments implemented by combining arbitrary structural elements in Embodiments 1 and 2; variations that a person skilled in the art would arrive at by modifying Embodiments 1 and 2 and their variations within the scope of the present invention; and various devices in which a display panel device according to the present invention is embedded.

For example, the present invention includes a display device including the display panel device in Embodiment 1 or 2 and a power source for supplying power to the positive power line 24 and the negative power line 25, in which the organic EL element includes a luminescence layer sandwiched between the anode and the cathode, and at least a plurality of luminescence pixels are arranged in a matrix pattern.

Further, in Embodiments 1 and 2, it is preferable that the first time constant for turning ON and OFF the selecting transistor 12 is equal to or greater than the second time constant for turning ON and OFF the switching transistor 16.

Large display panel requires wiring connections to many pixel units. This increases resistance of wiring and parasitic capacity. Therefore, in the case where control circuits are provided on both sides of the display panel, control of each switch delays in the region closer to center of the display panel compared to the end regions of the display panel.

Here, if the time constant for controlling the switching transistor 16 is greater than the time constant for controlling the selecting transistor 12, the suppression of the variation in the mobility correction period described in Embodiments 1 and 2 may not be achieved. According to the condition of the time constant described above, the second time constant of the switching transistor 16 is less than or equal to the first time constant of the selecting transistor 12. With this, the variation in the mobility correction period according to the present invention from when the signal voltage is supplied to the first capacitor electrode of the capacitor to cause the discharge current to flow in the state where conduction is caused between the source electrode of the driving transistor 11 and the second capacitor electrode of the capacitor 14 until non-conduction is caused between the source electrode of the driving transistor 11 and the second capacitor electrode of the capacitor 14 through the control of the switching transistor 16 can be reduced compared to the variation in the conventional mobility correction period from the signal voltage is supplied to the first capacitor electrode of the capacitor to cause the discharge current to flow in the state where the conduction is caused between the source electrode of the driving transistor 11 and the second capacitor electrode of the capacitor 14 until non-conduction is caused between the source electrode of the driving transistor 11 and the second capacitor electrode of the capacitor 14 through the control of the selecting transistor 12. Therefore, it is possible to precisely correct the mobility of the driver using discharge by precisely controlling the above period.

Further, in Embodiment 2, the scanning signal voltage of the scanning line 21 for turning ON and OFF the switching transistor 16 is used as the reference voltage VgL. Instead of causing the reference VgL in the scanning line 21, the reference voltage VgL may be caused in a scanning line or a control line that is different from the scanning line 21. In this case, the reference voltage is not limited to the value of the scanning signal voltage for turning ON and OFF the selecting transistor 12; and thus, flexibility of setting of the reference voltage value is improved.

In the above embodiments, the selecting transistor and the switching transistor are described as n-type transistors which are turned ON when the voltage levels of their gates become high. However, these transistors may be formed by p-type transistors and thus the polarity of the scanning line may be reversed. Even in the case of such a display panel device and such a display device, the same advantageous effects as described in the above embodiments can be produced.

Figure 13:
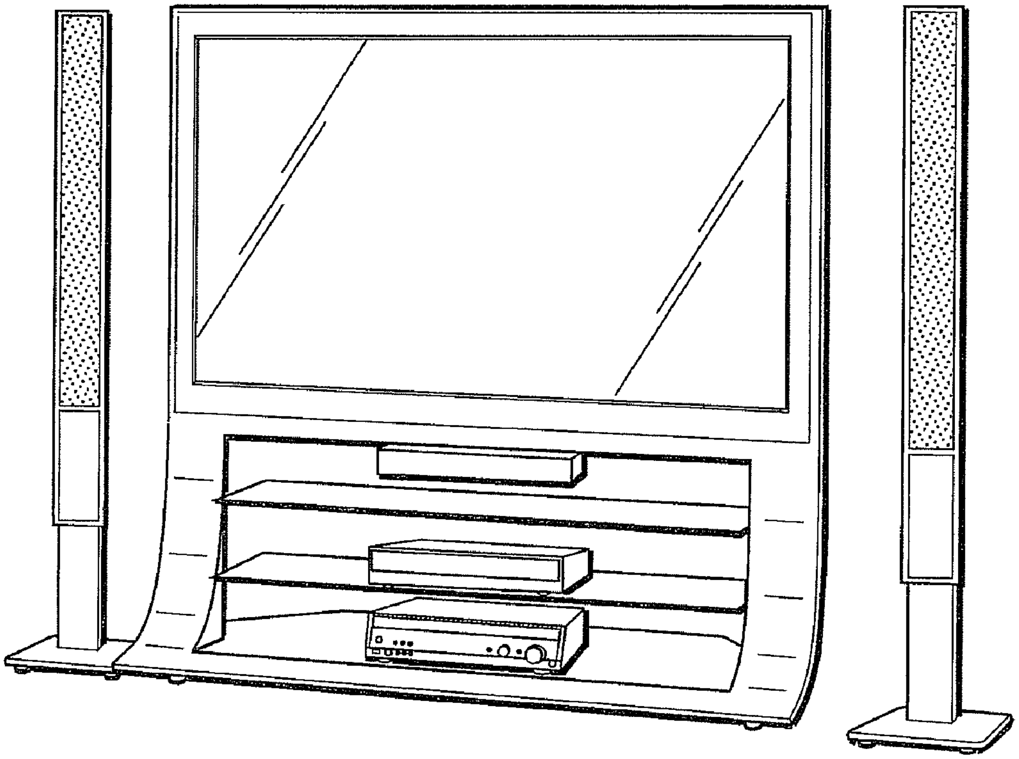
FIG. 13 is an external view of a thin flat TV including an embedded display panel device according to the present invention.

Moreover, the display panel device, the display device, or the control method thereof according to the present invention is built in a thin flat TV shown in FIG. 13, for example. With this built-in display panel device or display device in the present invention, the thin flat TV can be implemented in which the occurrence of variations in luminance due to the variations in the threshold voltage Vth and the mobility β is suppressed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The display panel device, the display device, and the control method thereof in the present invention are particularly useful as an active organic EL flat panel display which changes luminance by controlling luminescence intensity of a luminescence pixel using a pixel signal current corresponding to a shade of gray to be displayed.

What is claimed is:

1. A display panel device, comprising:

a luminescence element including a first luminescence electrode and a second luminescence electrode;

a first capacitor including a first capacitor electrode and a second capacitor electrode for holding a capacitor voltage;

a driver including a gate electrode, a drain electrode, and a source electrode for driving the luminescence element to produce a luminescence by allowing a drain current corresponding to the capacitor voltage to flow through the luminescence element, the gate electrode being connected to the first capacitor electrode, the source electrode being connected to the first luminescence electrode;

a first power line for determining a potential of the drain electrode of the driver;

a second power line electrically connected to the second luminescence electrode;

a data line for supplying a signal voltage to the first capacitor;

a first switch switchably interconnecting the data line and the first capacitor electrode;

a second switch switchably interconnecting the source electrode of the driver and the second capacitor electrode; and a controller for controlling the first switch and the second switch, wherein the controller is configured to:

turn ON the second switch to interconnect the source electrode of the driver and the second capacitor electrode, and, when the second switch is in an ON state, turn ON the first switch to interconnect the data line and the first capacitor electrode to supply the signal voltage to the first capacitor and flow a current between the source electrode of the driver and the second capacitor electrode; and turn OFF the second switch after an elapse of a predetermined time period after the signal voltage is supplied to the first capacitor to cause non-conduction between the source electrode of the driver and the second capacitor electrode, whereby a charge accumulated in the first capacitor is discharged when the current flows between the source electrode of the driver and the second capacitor electrode during the predetermined time period.

2. The display panel device according to claim 1, further comprising:

a second capacitor connected to the second capacitor electrode; and a bias voltage line for supplying, to the second capacitor, a reverse bias voltage which generates, in the first capacitor, a capacitor potential difference that is greater than a driver threshold voltage of the driver, wherein the controller is further configured to:

turn ON the second switch to interconnect the source electrode of the driver and the second capacitor electrode, and turn ON the first switch to supply the reverse bias voltage to the second capacitor while a fixed voltage for fixing a voltage of the first capacitor electrode is supplied from the data line, the reverse bias voltage generating, in the first capacitor, the capacitor potential difference that is greater than the driver threshold voltage; and turn ON the first switch while the driver is in an OFF state and the second switch is in the ON state to supply the signal voltage to the first capacitor electrode after the capacitor potential difference reaches the driver threshold voltage and the driver is in the OFF state.

3. The display panel device according to claim 2, wherein the controller is further configured to:

turn ON the first switch to supply the reverse bias voltage to the second capacitor while the fixed voltage for fixing the voltage of the first capacitor electrode is supplied from the data line, the reverse bias voltage generating, in the first capacitor, the capacitor potential difference that is greater than the driver threshold voltage;

turn OFF the first switch; and turn ON the first switch while the driver is in the OFF state and the second switch is in the ON state to supply the signal voltage to the first capacitor electrode after the capacitor potential difference reaches the driver threshold voltage and the driver is in the OFF state.

4. The display panel device according to claim 2, wherein the fixed voltage is set such that, after the capacitor potential difference reaches the driver threshold voltage and the driver is in the OFF state, a luminescence potential difference between the first luminescence electrode and the second luminescence electrode becomes lower than a luminescence threshold voltage of the luminescence element at which the luminescence element produces the luminescence.

5. The display panel device according to claim 1, further comprising:

a third power line for supplying, to the second capacitor electrode, a reference voltage which generates, in the first capacitor, a capacitor potential difference that is greater than a driver threshold voltage of the driver; and a third switch switchably interconnecting the second capacitor electrode and the third power line, wherein the controller is further configured to:

turn ON the third switch to interconnect the second capacitor electrode and the third power line to supply the reference voltage to the second capacitor electrode;

turn ON the first switch to supply a fixed voltage for fixing a voltage of the first capacitor electrode from the data line, and turn ON the first switch while the second switch is in the ON state and the driver is in an OFF state to supply the signal voltage to the first capacitor electrode after the capacitor potential difference reaches the driver threshold voltage and the driver is in the OFF state.

6. The display panel device according to claim 5, wherein the third power line is a scanning line, and the scanning line is configured to turn ON and turn OFF the first switch, and the scanning line supplies the reference voltage to turn OFF the first switch.

7. The display panel device according to claim 1, wherein a first time constant for turning ON and turning OFF the first switch is at least equal to a second time constant for turning ON and turning OFF the second switch.

8. A display device, comprising:

play panel device according to claim 1; and a power source that supplies power to the first power line and the second power line, wherein the luminescence element further includes a luminescent layer sandwiched between the first luminescence electrode and the second luminescence electrode, and a plurality of luminescence elements including the luminescence element is arranged in a matrix pattern.

9. The display device according to claim 8, wherein the luminescence element is an organic electroluminescence element.

10. A display device, comprising:

play panel device according to claim 1; and a power source that supplies power to the first power line and the second power line, wherein the luminescence element further includes a luminescent layer sandwiched between the first luminescence electrode and the second luminescence electrode, a pixel includes the luminescence element, the first capacitor, the driver, the first switch, and the second switch, and a plurality of pixels including the pixel are arranged in a matrix pattern.

11. A method of controlling a display device, wherein the display device includes:

a luminescence element having a first luminescence electrode and a second luminescence electrode;

a first capacitor having a first capacitor electrode and a second capacitor electrode for holding a capacitor voltage;

a driver having a gate electrode, a drain electrode, and a source electrode for driving the luminescence element to produce a luminescence by allowing a drain current corresponding to the capacitor voltage to flow through the luminescence element, the gate electrode being connected to the first capacitor electrode, the source electrode being connected to the first luminescence electrode;

a first power line for determining a potential of the drain electrode of the driver;

a second power line electrically connected to the second luminescence electrode;

a data line for supplying a signal voltage to the first capacitor;

a first switch switchably interconnecting the data line and the first capacitor electrode; and a second switch switchably interconnecting the source electrode of the driver and the second capacitor electrode, and the method comprising:

turning ON the second switch to interconnect the source electrode of the driver and the second capacitor electrode, and, when the second switch is in an ON state, turning ON the first switch to interconnect the data line and the first capacitor electrode to supply the signal voltage to the first capacitor and flow a current between the source electrode of the driver and the second capacitor electrode; and turning OFF the second switch after an elapse of a predetermined time period after the signal voltage is supplied to the first capacitor to cause non-conduction between the source electrode of the driver and the second capacitor electrode, whereby a charge accumulated in the first capacitor is discharged when the current flows between the source electrode of the driver and the second capacitor electrode during the predetermined time period.

* * * * *

UNITED STATES PATENT AND TRADEMARK OFFICE

CERTIFICATE OF CORRECTION

PATENT NO. : 8,294,701 B2
APPLICATION NO. : 13/035132
DATED : October 23, 2012
INVENTOR(S) : M. Matsui et al.

It is certified that error appears in the above-identified patent and that said Letters Patent is hereby corrected as shown below:

At column 33, line 15 (claim 8, line 2), please change "play" to --display--.

At column 33, line 15 (claim 8, line 2), please insert --the-- before "display".

At column 33, line 28 (claim 10, line 2), please change "play" to --display--.

At column 33, line 28 (claim 10, line 2), please insert --the-- before "display".

Signed and Sealed this
Fifth Day of February, 2013

Teresa Stanek Rea
*Acting Director of the United States Patent and Trademark Office*